United States Patent
Urano et al.

(10) Patent No.: US 10,288,031 B2
(45) Date of Patent: May 14, 2019

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventors: Shigeyuki Urano, Gotenba (JP); Masakatsu Nagai, Hiratsuka (JP); Yoshihiro Sakayanagi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 175 days.

(21) Appl. No.: 15/036,453

(22) PCT Filed: Nov. 10, 2014

(86) PCT No.: PCT/IB2014/002385
§ 371 (c)(1),
(2) Date: May 13, 2016

(87) PCT Pub. No.: WO2015/071725
PCT Pub. Date: May 21, 2015

(65) Prior Publication Data
US 2016/0290307 A1    Oct. 6, 2016

(30) Foreign Application Priority Data

Nov. 14, 2013   (JP) .................................. 2013-235803
Nov. 18, 2013   (JP) .................................. 2013-238077

(51) Int. Cl.
*F02D 35/02*       (2006.01)
*F02P 5/153*       (2006.01)
(Continued)

(52) U.S. Cl.
CPC ............ *F02P 5/045* (2013.01); *F02D 35/028* (2013.01); *F02D 37/02* (2013.01); *F02P 5/153* (2013.01);
(Continued)

(58) Field of Classification Search
CPC .. F02P 5/045; F02P 5/153; F02P 15/02; F02P 15/08; F02P 9/002; F02D 35/023; F02D 35/028; F02D 37/02; Y02T 10/46
See application file for complete search history.

(56) References Cited

U.S. PATENT DOCUMENTS 5,698,776 A    12/1997   Tomisawa
9,903,287 B2 *  2/2018   Kitagawa .............. F02D 35/023
(Continued)

FOREIGN PATENT DOCUMENTS

EP    2098712 A1    9/2009
EP    2119894 A1    11/2009
(Continued)

OTHER PUBLICATIONS

Heywood, John B., "Internal Combustion Engine Fundamentals, Combustion Process Characterization", Jan. 1, 1998 [McGraw-Hill Series in Mechanical Engineering], pp. 389-390. (cited in ISR).

*Primary Examiner* — Hieu T Vo
*Assistant Examiner* — Arnold Castro
(74) *Attorney, Agent, or Firm* — Hunton Andrews Kurth LLP

(57) ABSTRACT

A controller for an internal combustion engine includes a crank angle detector and an ECU. The ECU is configured to: (a) calculate a mass fraction burned; (b) acquire the crank angle, which is detected by the crank angle detector when the mass fraction burned reaches a predetermined mass fraction burned, as a specified crank angle; and (c) control at least one of an amount of fuel injected, an amount of intake air, or ignition energy on the basis of a first difference. The first difference is a difference between a first parameter and a second parameter. The first parameter is a crank angle period from an ignition time to the specified crank angle or a correlation value of the crank angle period. The second
(Continued)

parameter is a target value of the crank angle period or a target value of the correlation value.

22 Claims, 19 Drawing Sheets

(51) Int. Cl.
    *F02D 37/02*     (2006.01)
    *F02P 5/04*     (2006.01)
    *F02P 9/00*     (2006.01)
    *F02D 41/14*     (2006.01)
    *F02P 15/02*     (2006.01)
    *F02P 15/08*     (2006.01)

(52) U.S. Cl.
    CPC ........ *F02D 35/023* (2013.01); *F02D 41/1475* (2013.01); *F02P 9/002* (2013.01); *F02P 15/02* (2013.01); *F02P 15/08* (2013.01); *Y02T 10/46* (2013.01)

(56) References Cited

U.S. PATENT DOCUMENTS

2002/0144672 A1   10/2002   Hosoya
2010/0071659 A1    3/2010   Moriya et al.
2016/0108843 A1*   4/2016   Han .................... F02D 41/0085
                                                                                          701/103
2016/0290307 A1*  10/2016   Urano ...................... F02P 5/045

FOREIGN PATENT DOCUMENTS

| JP | H02-153243 A | 6/1990 |
|----|---|---|
| JP | H07-42607 A | 2/1995 |
| JP | H08-232820 A | 9/1996 |
| JP | H09-317522 A | 12/1997 |
| JP | H10331682 A | 12/1998 |
| JP | 2002-310049 A | 10/2002 |
| JP | 2008202460 A | 9/2008 |
| JP | 2010-007581 A | 1/2010 |
| JP | 2010-190196 A | 9/2010 |

* cited by examiner

CONTROLLER FOR INTERNAL COMBUSTION ENGINE

CROSS-REFERENCE TO RELATED APPLICATIONS

This is a national phase application based on the PCT International Patent Application No. PCT/IB2014/002385 filed Nov. 10, 2014, claiming priority to Japanese Patent Application Nos. 2013-235803 and 2013-238077 filed Nov. 14, 2013 and Nov. 18, 2013, respectively, the entire contents of all of which are incorporated herein by reference.

BACKGROUND OF THE INVENTION

1. Field of the Invention

The present invention relates to a controller for an internal combustion engine.

2. Description of Related Art

In the related art, a controller for an internal combustion engine that performs a lean-burning operation is disclosed, for example, in Japanese Patent Application Publication No. 9-317522 (JP 9-317522 A). In the controller in the related art, in order to enable the lean-burning operation while reducing exhaust emissions, an actual crank angle at the time of reaching a predetermined mass fraction burned is detected and an amount of fuel supplied is adjusted on the basis of the comparison result of the detected crank angle with a target crank angle.

SUMMARY OF THE INVENTION

By only using the crank angle at the time of reaching the predetermined mass fraction burned as a parameter for the control of an amount of fuel injected as in the control method described in JP 9-317522 A, the air-fuel ratio cannot be appropriately represented by the parameter. As a result, there is a possibility that it will be difficult to appropriately control the combustion of the internal combustion engine.

The invention provides a controller for an internal combustion engine that can appropriately control combustion using a crank angle when a mass fraction burned reaches a predetermined mass fraction burned.

According to an aspect of the invention, there is provided a controller for an internal combustion engine, including a crank angle detector and an electronic control unit (ECU). The crank angle detector is configured to detect a crank angle. The ECU is configured to: (a) calculate a mass fraction burned; (b) acquire the crank angle, which is detected. by the crank angle detector when the mass fraction burned reaches a predetermined mass fraction burned, as a specified crank angle; and (c) control at least one of an amount of fuel injected, an amount of intake air, or ignition energy on the basis of a first difference. The first difference is a difference between a first parameter and a second parameter. The first parameter is a crank angle period from an ignition time to the specified crank angle or a correlation value of the crank angle period. The second parameter is a target value of the crank angle period or a target value of the correlation value.

According to this configuration, the crank angle period, which is specified as a period from the ignition time to the specified crank angle using the ignition time in addition to the specified crank angle when the predetermined mass fraction burned is acquired, and the correlation value thereof have a high correlation with the air-fuel ratio. Accordingly, according to the aspect, it is possible to appropriately control the combustion by adjusting at least one of the amount of fuel injected, the amount of intake air, or the ignition energy on the basis of the first difference between the crank angle period or the correlation value thereof and the target value of the crank angle period or the like. When one or both of the amount of fuel injected and the amount of intake air are adjusted, it is possible to appropriately control the air-fuel ratio.

In the aspect, the ECU may be configured to control at least one of the amount of fuel injected, the amount of intake air, or the ignition energy on the basis of the first difference when an air-fuel ratio of fuel-air mixture in a cylinder is controlled in the vicinity of a lean-burning limit.

According to this configuration, it is possible to appropriately control the air-fuel ratio of the fuel-air mixture in a cylinder in the vicinity of the lean-burning limit.

In the aspect, the ECU may be configured to set the target value on the basis of an engine rotation speed.

According to this configuration, it is possible to appropriately set the target value of the crank angle period or the correlation value thereof in consideration of an influence of the engine rotation speed.

In the aspect, the ECU may be configured to set the target value on the basis of an engine load factor.

According to this configuration, it is possible to appropriately set the target value of the crank angle period or the correlation value thereof in consideration of an influence of the engine load factor.

In the aspect, the ECU may be configured to set the target value on the basis of a degree of separation of a target ignition time from an optimal ignition time. The ECU may be configured to set the target value to be smaller as a degree of delay of the ignition time with respect to the optimal ignition time becomes larger. The ECU may be configured to set the target value to be larger as a degree of advance of the ignition time with respect to the optimal ignition time becomes larger.

According to this configuration, it is possible to appropriately set the target value of the crank angle period or the correlation value thereof in consideration of a variation in the optimal ignition time due to the change in the air-fuel ratio based on the adjustment by adjustment means.

In the aspect, the ECU may be configured to: (d) calculate a combustion gravity center position on the basis of the mass fraction burned; and (e) control the ignition time such that a second difference between the combustion gravity center position and a target combustion gravity center position is zero.

According to this configuration, it is possible to appropriately correct the degree of separation of the ignition time from the target ignition time due to the variation in the air-fuel ratio based on the adjustment by the adjustment means using the combustion gravity center position which is not likely to be affected by the variation in the air-fuel ratio.

In the aspect, the ECU may be configured to: (f) acquire a maximum in-cylinder pressure crank angle at which the in-cylinder pressure is a maximum in a combustion period; and (g) control the ignition time such that a third difference between the maximum in-cylinder pressure crank angle and a target maximum in-cylinder pressure crank angle is zero.

According to this configuration, it is possible to appropriately correct the degree of separation of the ignition time from the target ignition time due to the variation in the air-fuel ratio based on the adjustment of the amount of fuel injected or the like by the adjustment means using the maximum in-cylinder pressure crank angle which is not likely to be affected by the variation in the air-fuel ratio.

In the aspect, the ECU may be configured to control at least one of the amount of fuel injected, the amount of intake air, or the ignition energy on the basis of the first difference when the second difference is equal to or less than a predetermined value by the control of the ignition time. The ECU may be configured to control at least one of the amount of fuel injected, the amount of intake air, or the ignition energy on the basis of the first difference when the third difference is equal to or less than a predetermined value by the control of the ignition time.

According to this configuration, by causing the adjustment means to adjust the amount of fuel injected or the like in a state where the ignition time converges on an appropriate value through adjustment by ignition time adjusting means, it is possible to further appropriately control the air-fuel ratio through the adjustment of the amount of fuel injected or the like by the adjustment means.

In the aspect, the ECU may be configured to control a response speed of the control of the ignition time so as to be higher than a response speed of at least one of the amount of fuel injected, the amount of intake air, or the ignition energy.

According to this configuration, it is possible to secure more opportunities to adjust the amount of fuel injected or the like by the use of the adjustment means in the state where the ignition time converges on an appropriate value through the adjustment by the ignition time adjusting means.

In the aspect, the predetermined mass fraction burned may be 10%.

According to this configuration, it is possible to appropriately set the specified crank angle for specifying the crank angle period in consideration of noise resistance and a decrease in the number of steps.

In the aspect, the ECU may be configured to: (h) acquire a main combustion period on the basis of the mass fraction burned; and (i) change the target value depending on the length of the main combustion period.

According to this configuration, by changing the target value depending on the length of the main combustion period, it is possible to appropriately set the lean-burning limit in consideration of the variation in the main combustion period (main combustion rate) due to the aged deterioration or the like.

In the aspect, the ECU may be configured to set the target value to be smaller as the main combustion period becomes longer.

According to this configuration, by changing the target value to a smaller value as the main combustion period becomes longer, it is possible to appropriately set the lean-burning limit in consideration of the variation in the main combustion period (main combustion rate) due to the aged deterioration or the like.

In the aspect, the ECU may be configured to set the target value to be larger as the ignition time is more delayed when the main combustion period is shorter than a predetermined value.

According to this configuration, it is possible to appropriately set the lean-burning limit with attention paid to the tendency that the ignition limit is improved with the delay of the ignition time under a situation in which the main combustion period is short (that is, the main combustion rate is high).

In the aspect, the ECU may be configured to set the target value to be larger within a range not greater than a value at an ignition limit of a fuel-air mixture in a cylinder on the basis of the main combustion period when the main combustion period is shorter than a predetermined value.

According to this configuration, it is possible to appropriately set the target value within a range not greater than the ignition limit under the situation in which the main combustion period is short (that is, the main combustion rate is high).

In the aspect, the ECU may be configured to change the target value depending on the length of the main combustion period when the second difference is equal to or less than a predetermined value by the control of the ignition time. The ECU may be configured to change the target value depending on the length of the main combustion period when the third difference is equal to or less than a predetermined value by the control of the ignition time.

According to this configuration, by changing the target value depending on the length of the main combustion period when the second difference or the third difference is equal to or less than the predetermined value through the adjustment by the ignition time adjusting means, it is possible to further appropriately set the target value depending on the length of the main combustion period without being affected by the displacement of the ignition time from the target ignition time due to the variation in the air-fuel ratio based on the adjustment by the adjustment means.

In the aspect, the ECU may be configured to change the target value depending on the length of the main combustion period when the first difference is equal to or less than a predetermined value.

According to this configuration, by changing the target value depending on the length of the main combustion period when the first difference is equal to or less than the predetermined value through the adjustment by the adjustment means, it is possible to remove the influence which is given to the main combustion period from the insufficient adjustment by the adjustment means and to accurately understand the length of the main combustion period due to the aged deterioration or the like on the basis of the acquired value of the main combustion period. Accordingly, it is possible to more appropriately set the target value on the basis of the length of the main combustion period.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a diagram illustrating a relationship between each of a fuel mileage, a torque fluctuation, and SA-CA10 and an air-fuel ratio (A/F), which is used to explain a variation in lean limit due to an influence of aged deterioration or the like;

DETAILED DESCRIPTION OF EMBODIMENTS

Figure 1:
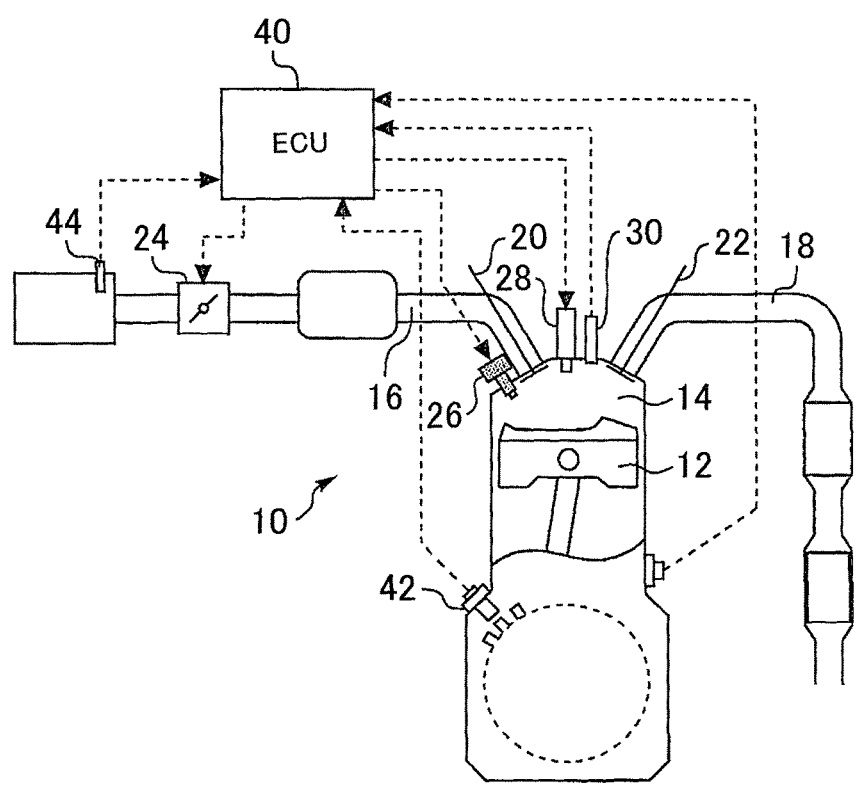
FIG. 1 is a diagram illustrating a system configuration of an internal combustion engine in Embodiment 1 of the invention.

FIG. 1 is a diagram illustrating a system configuration of an internal combustion engine 10 in Embodiment 1 of the invention. The system illustrated in FIG. 1 includes a spark-ignition internal combustion engine 10. A piston 12 is disposed in a cylinder of the internal combustion engine 10. A combustion chamber 14 is formed on the top side of the piston 12 in the cylinder. The combustion chamber 14 communicates with an intake air passage 16 and an exhaust gas passage 18.

An intake port of the intake air passage 16 is provided with an intake valve 20 opening and shutting the intake port, and an exhaust port of the exhaust gas passage 18 is provided with an exhaust valve 22 opening and shutting the exhaust port. The intake air passage 16 is provided with an electronically-controlled throttle valve 24.

Each cylinder of the internal combustion engine 10 is provided with a fuel injection valve 26 directly injecting fuel into the combustion chamber 14 (the cylinder) and an ignition plug 28 igniting a fuel-air mixture. Each cylinder is provided with an in-cylinder pressure sensor 30 detecting an in-cylinder pressure.

The system according to this embodiment includes an electronic control unit (ECU) 40. The input part of the ECU 40 is connected to various sensors for acquiring an operation state of the internal combustion engine 10, such as a crank angle sensor 42 for acquiring an engine rotation speed and an air flow meter 44 for measuring an amount of intake air in addition to the in-cylinder pressure sensor 30. The output part of the ECU 40 is connected to various actuators for controlling the operation of the internal combustion engine 10, such as the throttle valve 24, the fuel injection valve 26, and the ignition plug 28. The ECU 40 performs predetermined engine control such as fuel injection control and ignition control by driving various actuators on the basis of the outputs of the sensors and a predetermined program. The ECU 40 has a function of AD-converting the output signal of the in-cylinder pressure sensor 30 in synchronization with a crank angle and acquiring the resultant output signal. Accordingly, it is possible to detect an in-cylinder pressure at an arbitrary crank angle time within an allowable resolution range of the AD conversion. The ECU 40 has a function of calculating a value of an in-cylinder volume, which is determined depending on the position of a crank angle, depending on the crank angle.

Figure 2:
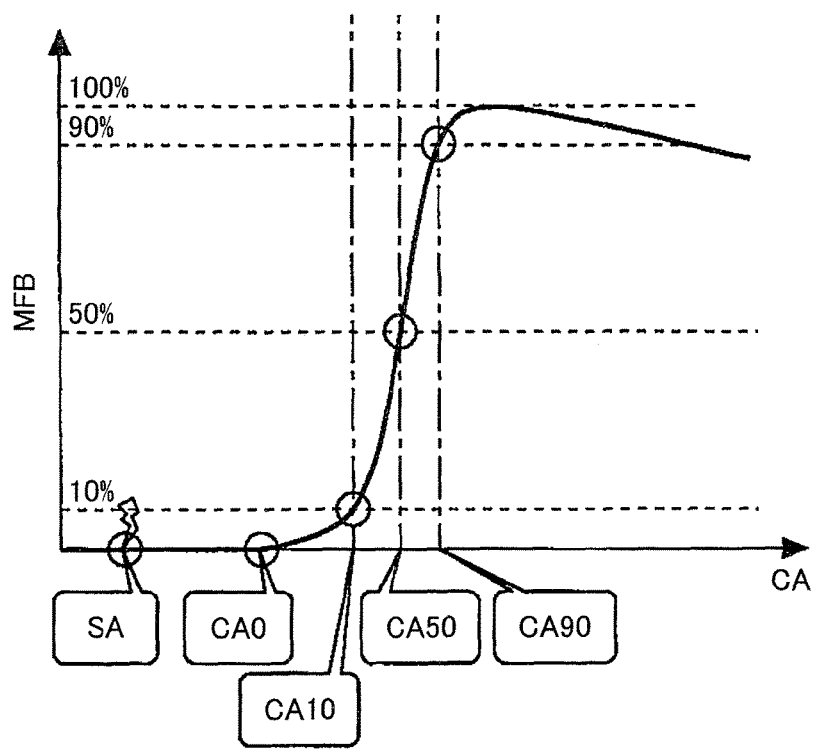
FIG. 2 is a diagram illustrating a waveform of an ignition time and a mass fraction burned.

FIG. 2 is a diagram illustrating a waveform of an ignition time and a mass fraction burned. In the system according to this embodiment including the in-cylinder pressure sensor 30 and the crank angle sensor 42, it is possible to acquire in-cylinder pressure data (in-cylinder pressure waveform) based on the crank angle (CA) in each cycle of the internal combustion engine 10. Then, it is possible to calculate a mass fraction burned (hereinafter, referred to as "MFB") having the same waveform as illustrated in FIG. 2 using the in-cylinder pressure waveform, which has been subjected to an absolute pressure correction using a known method. More specifically, an in-cylinder calorific value Q at a crank angle θ can be calculated by Expression (1) using the in-cylinder pressure data. The MFB at a crank angle θ can be calculated by Expression (2) using the data of the calculated in-cylinder calorific value Q. Accordingly, a crank angle when the MFB is equal to a predetermined ratio α (%) (hereinafter, referred to as, "CAα") can be acquired using Expression (2).

$$Q = \int PdV + \frac{1}{\kappa - 1}(PV - P_0 V_0) \quad (1)$$

$$MFB = \frac{Q(\theta) - Q(\theta_{Sta})}{Q(\theta_{fin}) - Q(\theta_{Sta})} \quad (2)$$

In Expression (1), P denotes an in-cylinder pressure, V denotes an in-cylinder volume, and k denotes a specific heat ratio of gas in a cylinder. $P_0$ and $V_0$ denote an in-cylinder pressure and an in-cylinder volume, respectively, at a calculation start point $\theta_0$ (at a specified crank angle θ in a compression stroke (after the intake valve 20 is shut) determined with a margin with respect to an assumed combustion start point). In Expression (2), $\theta_{sta}$ denotes a combustion start point (CA0) and $\theta_{fin}$ denotes a combustion finish point (CA100).

Here, a representative crank angle CAα will be described below with reference to FIG. 2. The combustion in a cylinder is started with an ignition delay after the fuel-air mixture is ignited at an ignition time. This combustion start point, that is, a point indicating that the MFB is started, is referred to as CA0. The crank angle period (CA0 to CA10) from CA0 to the crank angle CA10 at which the MFB is 10% corresponds to an initial combustion period, and the crank angle period (CA10 to CA90) from CA10 to the crank angle CA90 at which the MFB is 90% corresponds to a main combustion period. The crank angle CA50 at which the MFB is 50% corresponds to a combustion gravity center position.

Figure 3:
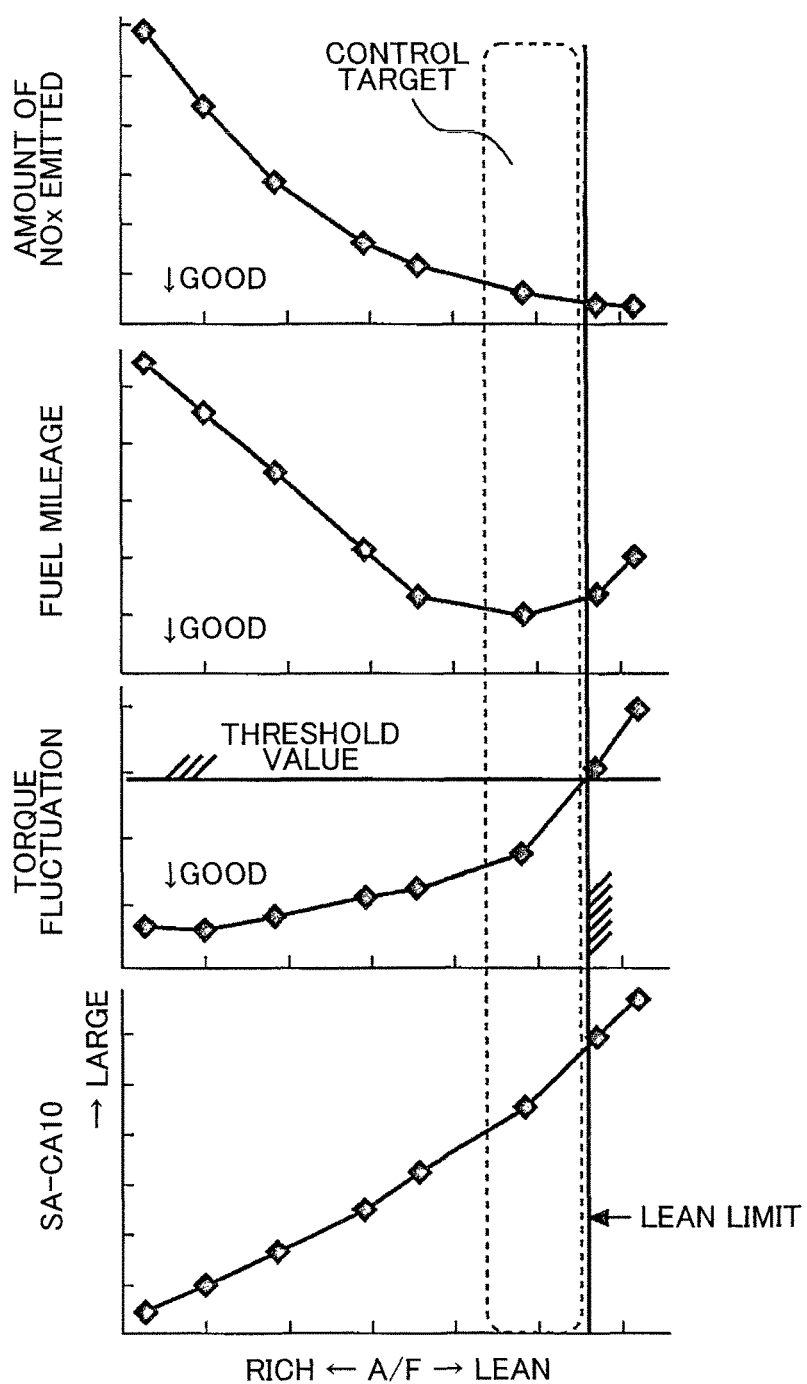
FIG. 3 is a diagram illustrating a relationship between each of an amount of NOx emitted, a fuel mileage, a torque fluctuation, and SA-CA10 and an air-fuel ratio (A/F)

FIG. 3 is a diagram illustrating a relationship between each of an amount of NOx emitted, a fuel mileage, a torque fluctuation, and SA-CA10 and an air-fuel ratio (A/F). As a low fuel-mileage technique of an internal combustion engine, a lean-burning operation that is performed at an air-fuel ratio lower than a theoretical air-fuel ratio can be effectively used. The lower the air-fuel ratio becomes, the better the fuel mileage becomes and the smaller the amount of NOx emitted becomes. However, when the air-fuel ratio is excessively low, the combustion deteriorates and thus the fuel mileage deteriorates. On the other hand, the torque fluctuation slowly increases as the air-fuel ratio becomes lean and rapidly increases as the air-fuel ratio becomes lean to exceed a certain value. Here, the torque fluctuation means a variation value from time-series torque values. More specifically, the torque fluctuation can be obtained as the amplitude, the standard deviation, or the average value of the absolute value of the time-series torque values subjected to a filtering process after performing the filtering process of a specific frequency band on the time-series torque values. Hereinafter, the air-fuel ratio at the lean-burning limit of the fuel-air mixture, more specifically, the air-fuel ratio when the torque fluctuation value reaches a threshold value as a limit from the viewpoint of drivability of the internal combustion engine 10, is referred to as "lean limit".

In order to realize a low fuel mileage and low NOx emission, it can be said to be preferable from FIG. 3 that the state of the internal combustion engine 10 be monitored and the air-fuel ratio be controlled to be as lean as possible within a range in which the drivability does not degrade, that is, the air-fuel ratio be controlled in the vicinity of the lean limit. Hereinafter, this air-fuel ratio control is referred to as "lean limit control".

In the lean limit control according to the related art, a torque fluctuation during operation is detected by statistically processing torques (or torque-corresponding values) and the air-fuel ratio is controlled in the vicinity of the lean limit on the basis of the detected torque fluctuation. However, in the technique according to the related art, quick lean limit control cannot be implemented (there is a period in which such air-fuel ratio control cannot be performed). The reason is that the torque fluctuation is a parameter based on the statistical process and thus cannot be calculated until a predetermined number of combustion times (for example, 100 times) occur. Since the torque fluctuation is a value based on the fluctuation of an engine torque during normal operation, it is difficult to distinguish the torque fluctuation from a transient variation in torque due to various factors (such as an operation of an accelerator pedal of a vehicle and a response delay of air or EGR gas). In order to increase the number of control opportunities, it is necessary to allow a transient variation and thus the calculation accuracy of the torque fluctuation is lowered. In the technique according to the related art, degradation in vibration noise of the internal combustion engine cannot be prevented. The reason is that the torque fluctuation is treated as statistics and thus it is not possible to cope with combustion degradation which suddenly occurs. For example, when 99 combustion times out of 100 combustion times are normal and only one combustion time is abnormal, such sudden combustion degradation does not appear in the calculated value of the torque fluctuation, but such combustion degradation may occur in the vicinity of the lean limit. It is difficult to perform the lean limit control according to the related art in a mode other than a mode in which all cylinders are uniformly controlled. The reason is that the torque generated from the whole engine is treated, not from each cylinder. If the torque fluctuation is calculated using the combustion torque of each cylinder, the above-described problem becomes marked. That is, if all the cylinders are uniformly controlled and the predetermined number of combustion times required for calculating the torque fluctuation through the statistical process is 100, the number of combustion times required for performing the statistical process for every cylinder is equal to 100×number of cylinders. Accordingly, when the torque fluctuation is calculated for each cylinder, the period of time required for calculating the torque fluctuation increases, multiply depending on the number of cylinders, compared with a case in which the torque fluctuation is calculated uniformly for the whole cylinders.

As described above, in the technique using the torque fluctuation based on the statistical process, since a long time is required and the technique is not established in a transient operation, the practicality thereof is low. Therefore, in this embodiment, as a lean limit control method not depending on the statistical process for solving such a problem, the feedback control of the amount of fuel injected based on the crank angle period (SA-CA10) from the ignition time (SA) to CA10 which is a 10% combustion point is performed for each cylinder. More specifically, the feedback control is to adjust the amount of fuel injected on the basis of the difference between a predetermined target SA-CA10 in the vicinity of the lean limit and an actual SA-CA10 (more specifically, so as to make the difference zero). Here, the actual SA-CA10 is a value calculated as a crank angle period from the ignition time to CA10 which is obtained by acquiring in-cylinder pressure data from the in-cylinder pressure sensor (CPS) 30 and the crank angle sensor 42 and analyzing the in-cylinder data.

An advantage that SA-CA10 is used as a parameter for the lean limit control according to this embodiment will be described below. SA-CA10 is a parameter representing an ignition delay. As illustrated in FIG. 3, SA-CA10 has a high correlation with the air-fuel ratio and keeps linearity with respect to the air-fuel ratio in the vicinity of the lean limit good. Accordingly, it is easy to feedback-control the air-fuel ratio in the vicinity of the lean limit using SA-CA10.

SA-CA10 can be said to be higher in representativeness of the lean limit than the air-fuel ratio for the following reasons. That is, it has been confirmed by experiment of the inventor and the like that the air-fuel ratio as the lean limit varies depending on the operation condition (for example, the coolant temperature of the engine), but SA-CA10 does not vary more than the air-fuel ratio depending on the operation condition. In other words, since the air-fuel ratio as the lean limit greatly depends on an ignition factor of fuel-air mixture, SA-CA10 representing the ignition delay is less affected by the operation condition or the like than the air-fuel ratio. When the engine rotation speed varies, the time per unit crank angle varies and thus it is preferable that a target SA-CA10 which is a target value of SA-CA10 be set depending on the engine rotation speed. More preferably, since SA-CA10 also varies depending on an engine load factor, the target SA-CA10 only has to be set depending on the engine load factor instead of or in addition to the engine rotation speed.

A reason will be described below that CA10 is more preferably used as a combustion point (a specified crank angle when the MFB is a predetermined mass fraction burned) used to specify the crank angle period as an index of the lean limit control according to this embodiment with respect to the ignition time than the other combustion points. The specified crank angle is not limited to CA10 but another arbitrary combustion point can be used. When another arbitrary combustion point is used, the resultant crank angle period basically has a merit that the correlation with the air-fuel ratio is high and the representativeness of the lean limit is high. However, when a combustion point in a main combustion period (CA10-CA90) after CA10 is used, the resultant crank angle period is greatly affected by parameters (such as an EGR rate, an intake air temperature, and a tumble ratio) which have an influence on the combustion when flame is diffused. That is, the resultant crank angle period is not purely paying attention to the air-fuel ratio, but is weakened to disturbance. In order to exclude the influence of disturbance, a configuration for correcting the crank angle period depending on the parameter causes an increase in an suitable number of process steps. On the contrary, when a combustion point in the initial combustion period (CA0-CA10) is used, the resultant crank angle period is not affected well by the parameter and reflects the influence of a factor affecting the ignition well. As a result, controllability thereof is improved. On the other hand, the combustion start point (CA0) or the combustion finish point (CA100) is likely to cause an error due to an influence of noise overlapping with an output signal from the in-cylinder pressure sensor 30 acquired by the ECU 40. The influence of noise becomes smaller as the combustion point gets farther from the combustion start point (CA0) or the combustion finish point (CA100). Accordingly, from the viewpoint of noise resistance and a decrease in the suitable number of process steps (suitable response potential), CA10 can be most excellently used as the specified crank angle as in this embodiment.

Figure 4:
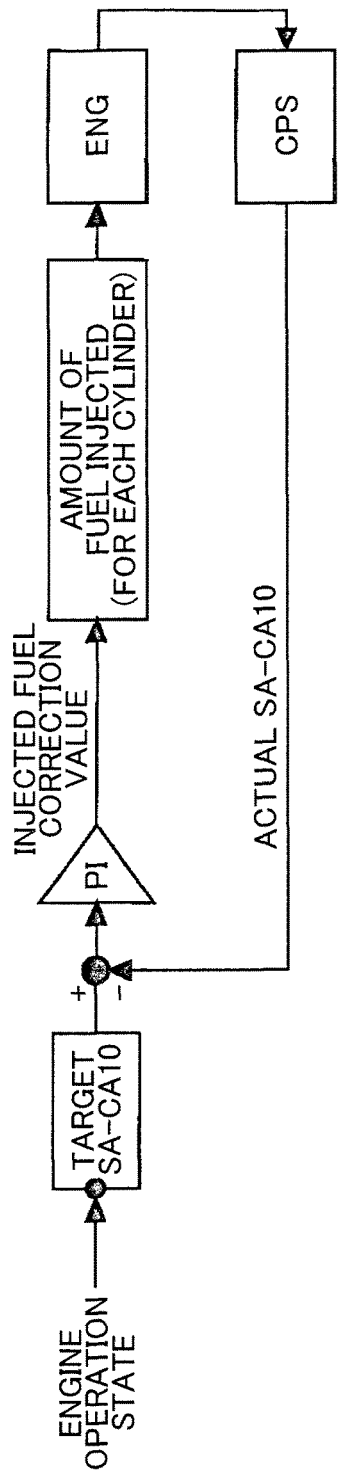
FIG. 4 is a block diagram illustrating the outline of feedback control of an amount of fuel injected using SA-CA10 according to Embodiment 1 of the invention.

FIG. 4 is a block diagram illustrating the outline of the feedback control of an amount of fuel injected using SA-CA10 according to Embodiment 1 of the invention. The feedback control using SA-CA10 which corresponds to the lean limit control according to this embodiment is to adjust the amount of fuel injected on the basis of a difference between a target SA-CA10 in the vicinity of the lean limit and an actual SA-CA10 (more specifically, so as to make the difference zero).

In this feedback control, as illustrated in FIG. 4, the target SA-CA10 depending on the engine operation state (specifically, the engine rotation speed and the engine load factor) is set. Here, the actual SA-CA10 is a value calculated as a crank angle period from the ignition time to CA10 which is obtained by acquiring in-cylinder pressure data from the in-cylinder pressure sensor (CPS) 30 and the crank angle sensor 42 and analyzing the in-cylinder data. The actual SA-CA10 is calculated for each cycle for each cylinder.

In the feedback control, in order to adjust the amount of fuel injected so as to make the difference between the target SA-CA10 and the actual SA-CA10 zero, PI control is used as an example. In the PI control, an injected fuel correction value corresponding to the difference between the target SA-CA10 and the actual SA-CA10 and the magnitude of the integrated value thereof is calculated using the difference and a predetermined PI gain (a proportional gain and an integral term gain). The injected fuel correction value calculated for each cylinder is reflected in the amount of fuel injected of the corresponding cylinder. Accordingly, the amount of fuel injected supplied to each cylinder of the internal combustion engine (ENG) 10 is adjusted (corrected) by the feedback control.

Figure 5:
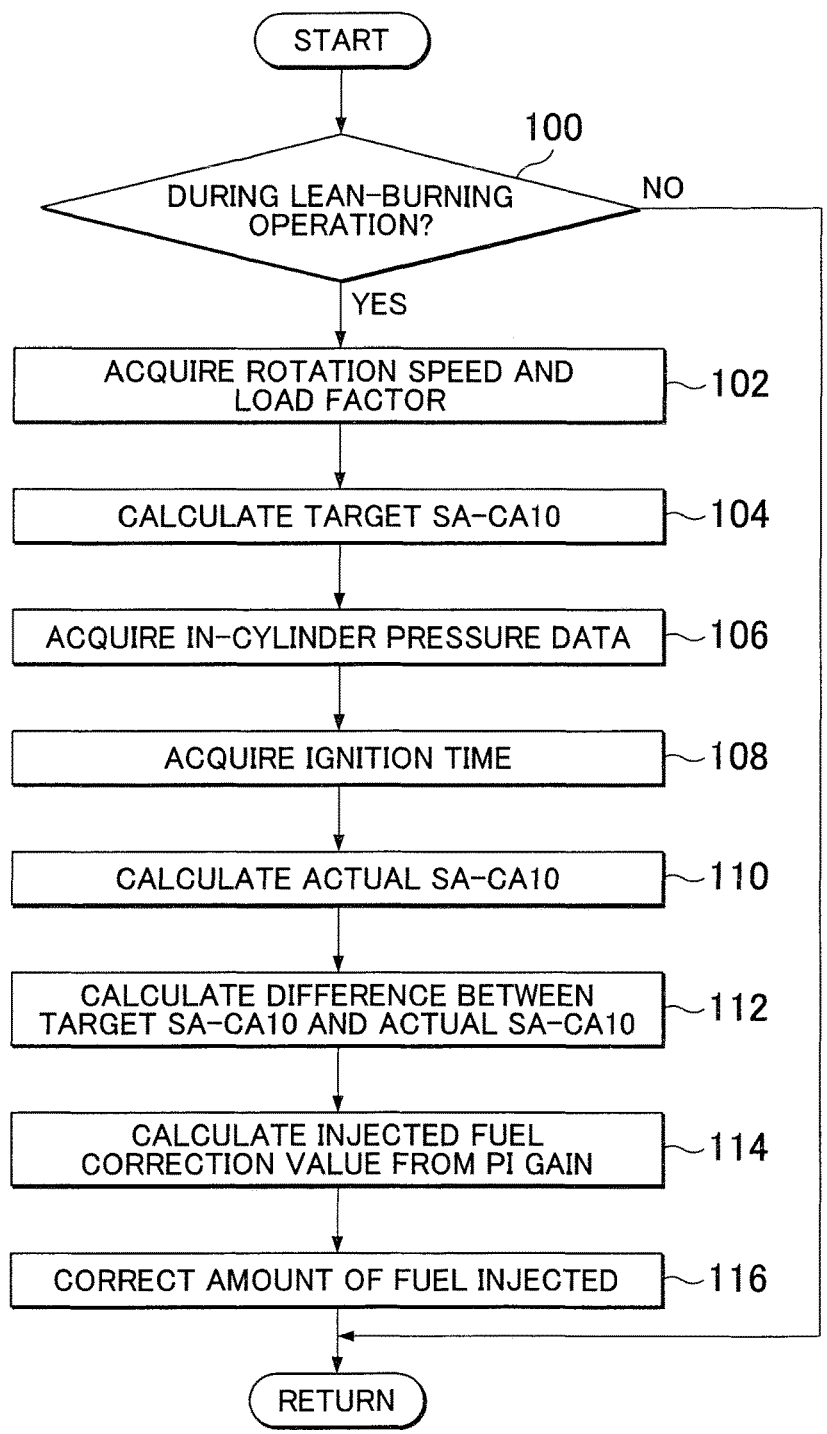
FIG. 5 is a flowchart illustrating a routine that is performed in Embodiment 1 of the invention.

FIG. 5 is a flowchart illustrating a control routine that is performed by the ECU 40 so as to implement the lean limit control using SA-CA10 in Embodiment 1 of the invention. This routine is repeatedly performed every cycle at a predetermined time after the combustion finishes in each cylinder.

In the routine illustrated in FIG. 5, the ECU 40 first determines whether a lean-burning operation is being performed (step 100). The internal combustion engine 10 performs a lean-burning operation at an air-fuel ratio lower than a theoretical air-fuel ratio in a predetermined operation area. Here, it is determined whether the current operation area corresponds to the operation area in which the lean-burning operation is performed.

When it is determined in step 100 that the lean-burning operation is being performed, the engine rotation speed and the engine load factor are acquired using the crank angle sensor 42 and the air flow meter 44 (step 102). The engine load factor can be calculated on the basis of the engine rotation speed and the amount of intake air.

Then, the ECU 40 calculates a target SA-CA10 (step 104). The ECU 40 stores a map (not illustrated) in which the target SA-CA10 is determined in advance in correlation with the engine rotation speed and the engine load factor on the basis of experiment results or the like. In step S104, the target SA-CA10 is acquired on the basis of the engine rotation speed and the engine load factor acquired in step 102 with reference to the map.

Then, the ECU 40 acquires in-cylinder pressure data measured at the time of combustion using the in-cylinder pressure sensor 30 and the crank angle sensor 42 (step S106). Then, the ECU 40 acquires an ignition time (step 108). The ECU 40 stores a map (not illustrated) in which a target (request) ignition time (basically, optimal ignition time (hereinafter, referred to as "MBT")) is determined in correlation with the engine load factor and the engine rotation speed and acquires the ignition time with reference to the map in step S108.

Then, the ECU 40 calculates an actual SA-CA10 (step 110). The actual SA-CA10 is calculated as a crank angle period from the ignition time acquired in step 108 to CA10 obtained as the analysis result of the in-cylinder pressure data acquired in step 106. Since the actual SA-CA10 acquired using this method includes a predetermined irregularity (a combustion fluctuation that essentially occurs), a raw value may be used, but the injected fuel correction value to be described later is not stabilized in this case. Accordingly, a value obtained after the combustion fluctuation is removed by performing a predetermined annealing process on the actual SA-CA10 is used for the feedback control of the amount of fuel injected. For example, a method of taking a time-series moving average of a predetermined number of calculated values of the actual SA-CA10 closest to each other and including the currently-calculated value can be used as the annealing process. Instead of the annealing process, an irregularity amplitude equivalent to the calculated value of the actual SA-CA10 based on the assumed combustion fluctuation may be set as a control dead zone. That is, when the difference between the target SA-CA10 and the actual SA-CA10 to be described later is equal to or less than the irregularity amplitude equivalent, the amount of fuel injected may not be corrected.

Then, the ECU 40 calculates the difference between the target SA-CA10 and the actual SA-CA10 which are calculated in steps 104 and 110 (step 112). Then, the ECU 40 calculates the injected fuel correction value based on the calculated difference between the target SA-CA10 and the actual SA-CA10 and the integrated value thereof using the difference and a predetermined PI gain (a proportional gain and an integral term gain) (step 114). The ECU 40 corrects the amount of fuel injected to be used in a subsequent cycle on the basis of the calculated injected fuel correction value (step 116). Specifically, for example, when the actual SA-CA10 is greater than the target SA-CA10, the air-fuel ratio is inclined to the lean side than the target value from the relationship illustrated in FIG. 3 and thus the amount of fuel injected increases from the base value of the amount of fuel injected so as to correct the air-fuel ratio to the rich side.

According to the above-mentioned routine illustrated in FIG. 5, the feedback control is performed so as to make the difference between the target SA-CA10 and the actual SA-CA10 zero. As described above, SA-CA10 has linearity with respect to the air-fuel ratio even in the vicinity of the lean limit. Unlike the method according to this embodiment, when the amount of fuel injected is adjusted so that a specified crank angle is equal to the target value using only the specified crank angle at the time of reaching a predetermined mass fraction burned, the following problem occurs. That is, when the ignition time varies, the specified crank angle at the time of obtaining a predetermined mass fraction burned varies accordingly. On the contrary, even when the ignition time varies, the crank angle period from the ignition time to the specified crank angle hardly varies. Accordingly, by using the crank angle period (SA-CA10 in this embodiment) as an index for adjusting the amount of fuel injected, it is possible to exclude the influence of the ignition time and to suitably understand the correlation with respect to the air-fuel ratio, compared with the case where only the specified crank angle is used. In an operation requiring precise combustion control such as the lean-burning operation or the EGR operation in which a large amount of EGR gas is introduced, there is a problem in that it is difficult to accurately control the air-fuel ratio in the vicinity of the lean limit by the current air-fuel ratio control using an air-fuel ratio sensor. Therefore, by adjusting the amount of fuel injected on the basis of the difference between the target SA-CA10 and the actual SA-CA10 using the method according to this embodiment, it is possible to suitably control the air-fuel ratio in the vicinity of the lean limit in the lean-burning operation.

Since the method according to this embodiment dues not use the statistical process like the above-mentioned method according to the related art, it is possible to perform quick feedback control using the method according to this embodiment. Accordingly, it is possible to apply the method according to this embodiment to a transient operation. As a result, according to the method according to this embodiment, it is possible to implement the lean limit control under wide operation conditions and thus to exhibit fuel mileage performance and exhaust emission performance. It is also possible to perform the control for each cylinder.

In the method according to this embodiment, the target SA-CA10 is set on the basis of the engine rotation speed and the engine load factor. Accordingly, it is possible to appropriately set the target SA-CA10 in consideration of the influence of the variations in the engine rotation speed and the engine load factor.

In Embodiment 1, the amount of fuel injected is adjusted using the feedback control so as to make the difference between the target SA-CA10 and the actual SA-CA10 zero in the lean limit control using SA-CA10. However, in the invention, the adjustment based on the first difference between a crank angle period from the ignition time to a specified crank angle at the time of obtaining a predetermined mass fraction burned and a target crank angle period as a target value of the crank angle period may be performed on an amount of intake air or ignition energy instead of the amount of fuel injected. Two or more of the amount of fuel injected, the amount of intake air, or the ignition energy may be subjected to the adjustment. Specifically, when the actual SA-CA10 is greater than the target SA-CA10, the amount of intake air is decreased to correct the air-fuel ratio to a rich side in the adjustment of the amount of intake air, or the ignition energy is increased to shorten the ignition delay in the adjustment of the ignition energy. Here, for example, the adjustment of the amount of intake air is preferably performed using a known variable intake valve capable of controlling an amount of air introduced into a cylinder in each cycle with a high response speed. The adjustment of the ignition energy can be performed, for example, by providing plural ignition coils for the ignition plug 28 and changing the number of ignition coils used for discharge if necessary. When the amount of fuel injected or the amount of intake air is subjected to the adjustment, the air-fuel ratio is directly controlled by this control.

In Embodiment 1, CA10 corresponds to the "specified crank angle", the actual SA-CA10 corresponds to the "first parameter", the target SA-CA10 corresponds to the "second parameter", and the difference between the target SA-CA10 and the actual SA-CA10 corresponds to the "first difference".

Embodiment 2 of the invention will be described below with reference to FIGS. 6 to 9. A system according to this embodiment can be implemented by employing the hardware configuration illustrated in FIG. 1 and causing the ECU 40 to perform the routine illustrated in FIG. 9 to be described later instead of the routine illustrated in FIG. 5.

Figure 6:
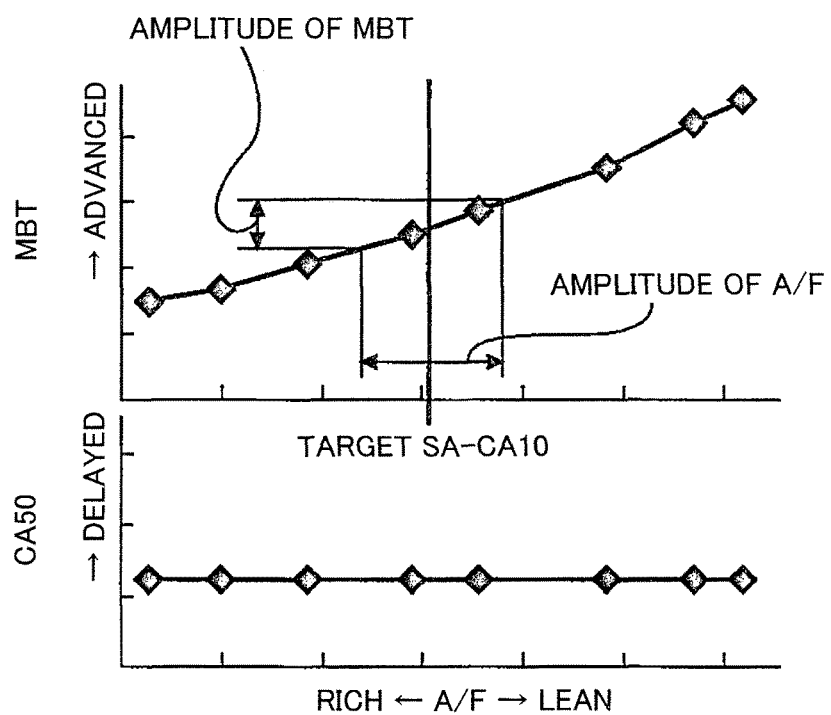
FIG. 6 is a diagram illustrating a relationship between an MBT and a combustion gravity center position (CA50 which is a 50% combustion point) in MBT control with respect to an air-fuel ratio in the vicinity of a lean limit.
Figure 7:
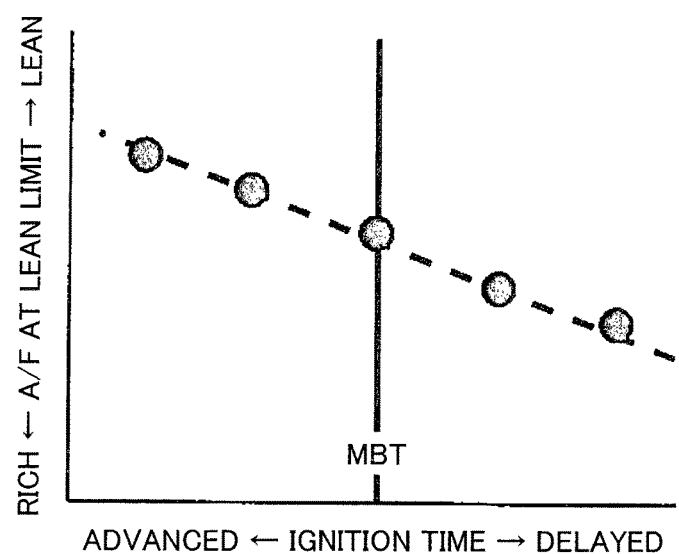
FIG. 7 is a diagram illustrating a relationship between an air-fuel ratio and an ignition time at the lean limit.

FIG. 6 is a diagram illustrating a relationship between an MBT and a combustion gravity center position (CA50 which is a 50% combustion point) in MBT control with respect to an air-fuel ratio in the vicinity of the lean limit. FIG. 7 is a diagram illustrating a relationship between an air-fuel ratio and an ignition time at the lean limit.

As illustrated in FIG. 6, the ignition time as the MBT varies depending on the air-fuel ratio. This is because the combustion rate varies with the variation in the air-fuel ratio. More specifically, when the air-fuel ratio is lean, the combustion is delayed. As a result, since it is necessary to more rapidly ignite, the MBT varies to an advance-side time. Particularly, in a lean air-fuel ratio area in the vicinity of the lean limit, the optimal ignition time varies with the minute variation in the air-fuel ratio. On the other hand, CA50 at the time of reaching the MBT is almost constant in the air-fuel ratio area in the vicinity of the lean limit as illustrated in FIG. 6.

When the amount of fuel injected is adjusted to make the difference between the target SA-CA10 and the actual SA-CA10 zero through the feedback control of the amount of fuel injected using SA-CA10 in Embodiment 1, the air-fuel ratio varies (the same is true when the amount of intake air is adjusted). More specifically, when the feedback control is performed, the air-fuel ratio varies with a certain amplitude with respect to an air-fuel ratio corresponding to a certain target SA-CA10 as illustrated in FIG. 6. As a result, the MBT also varies with a predetermined amplitude. On the other hand, the air-fuel ratio at the lean limit varies due to the influence of the ignition time as illustrated in FIG. 7. Accordingly, when the MBT varies with the variation in the air-fuel ratio due to the control of the amount of fuel injected using SA-CA10 but the ignition time is fixed to the MBT before the variation, the ignition time departs from the actual MBT corresponding to the current air-fuel ratio. For example, when the MBT varies to the advance side but the ignition time is fixed to the MBT before the variation, the current ignition time is delayed from the actual MBT and the air-fuel ratio at the lean limit is higher than that when the ignition time is controlled to the actual MBT, from the relationship illustrated in FIG. 7. As a result, when the air-fuel ratio is inclined to a lean-side value through the feedback control of an amount of fuel injected using SA-CA10, a misfire may occur.

Accordingly, when the feedback control of an amount of fuel injected using SA-CA10 is performed (the same is true when the feedback control of an amount of intake air is performed), it is preferable that the ignition time control for removing the influence of the variation in MBT due to the variation in the air-fuel ratio based on the feedback control be performed for each cylinder. Accordingly, in this embodiment, the feedback control of an amount of fuel injected using SA-CA10 and the feedback control of an ignition time using CA50 for removing the influence of the variation in MBT are performed in cooperation.

As described above with reference to FIG. 6, CA50 at the time of obtaining the MBT hardly varies with respect to the air-fuel ratio in the vicinity of the lean limit. Accordingly, by setting CA50 at the time of obtaining the MBT as a target CA50 and correcting the ignition time so as to make a difference between CA50 (hereinafter, referred to as "actual CA50"), which can be acquired as the analysis result of in-cylinder pressure data, and the target SA-CA10 zero, it is possible to adjust the ignition time to the MBT without being affected by the variation in the air-fuel ratio. In this way, the use of CA50 is suitable for controlling the ignition time in this case. The control of an ignition time using CA50 is not limited to control for obtaining the MBT. That is, the control of an ignition time using CA50 can also be used by setting the target CA50 depending on ignition efficiency to be described later even when an ignition time other than the MBT, such as delayed combustion, is set as the target ignition time.

In this embodiment, instead of freely performing the feedback control of an amount of fuel injected using SA-CA10, the feedback control of an amount of fuel injected using SA-CA10 is performed in a state where the difference between the target CA50 and the actual CA50 becomes equal to or less than a predetermined value through the feedback control of an ignition time using CA50.

In this embodiment, the control is configured so that a response speed of the feedback control of an ignition time using CA50 is higher than a response speed of the feedback control of an amount of fuel injected using SA-CA10.

As illustrated in FIG. 7, the air-fuel ratio at the lean limit varies depending on whether the ignition time is set to the MBT or an advanced or delayed time of the MBT. Nevertheless, when the target SA-CA10 is uniformly set regardless of whether the target ignition time is the MBT or an ignition time separated from the MBT, the following problem may occur. That, is, for example, when the target ignition time is considered to be a delayed time of the MBT in a state where the target SA-CA10 is set on the assumption of the air-fuel ratio at the lean limit corresponding to the MBT illustrated in FIG. 7, the air-fuel ratio at the lean limit is higher than that at the time of MBT control due to the delay of the target ignition time. As a result, in the state where the target SA-CA10 is set, when the air-fuel ratio is inclined to a lean side, the air-fuel ratio is lower than the air-fuel ratio at the lean limit and a misfire may occur.

Therefore, in this embodiment, the target SA-CA10 is set on the basis of a degree of separation of the target ignition time from the MBT. In the below description, target ignition efficiency is used as an index indicating a maximum value when the ignition time is the MBT and indicating the degree of separation of the target ignition time from the MBT. In other words, the target SA-CA10 is set on the basis of the target ignition efficiency.

Figure 8:
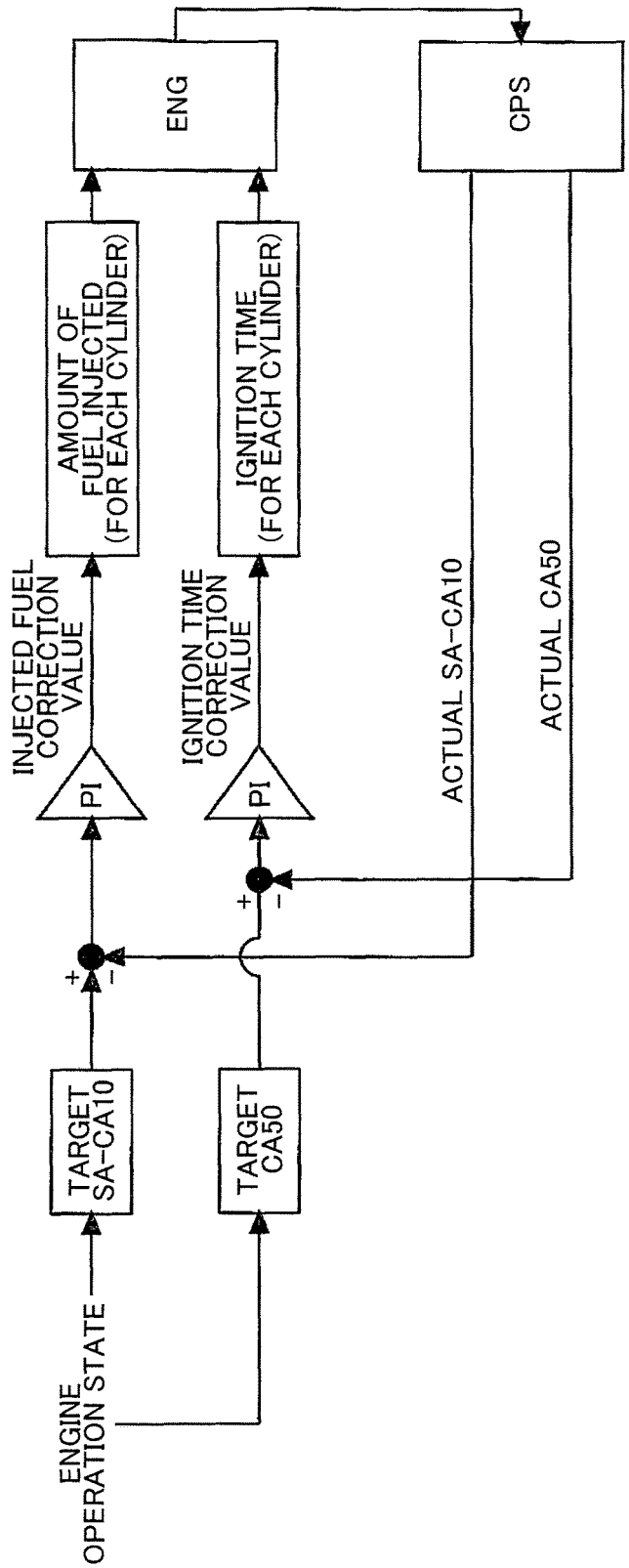
FIG. 8 is a block diagram illustrating the outline of feedback control using SA-CA10 and feedback control using CA50 according to Embodiment 2 of the invention.

FIG. 8 is a block diagram illustrating the outline of the feedback control using SA-CA10 and the feedback control using CA50 according to Embodiment 2 of the invention. In FIG. 8, the configuration for the feedback control of an amount of fuel injected using SA-CA10 is the same as illustrated in FIG. 4 in Embodiment 1. The feedback control using CA50 is to adjust the ignition time on the basis of the difference between the target CA50 and the actual CA50 (more specifically, so as to make the difference zero).

In order to correct the ignition time so as to make the difference between the target CA50 and the actual CA50 zero, for example, PI control is used for the feedback control using CA50. In the PI control, an ignition time correction value corresponding to the difference between the target CA50 and the actual CA50 and the magnitude of the integrated value thereof is calculated using the difference and a predetermined PI gain (a proportional gain and an integral term gain). The ignition time correction value calculated for each cylinder is reflected in the ignition time of the corresponding cylinder. Accordingly, the ignition time for each cylinder of the internal combustion engine (ENG) 10 is adjusted (corrected) by the feedback control. In the calculation of the actual CA50, a predetermined annealing process is performed for the same reason as described above for the actual SA-CA10.

In this embodiment, the following consideration is taken for the PI gain and the annealing process used for the feedback control so that the response speed of the feedback control of an ignition time using CA50 is higher than the response speed of the feedback control of an amount of fuel injected using SA-CA10. That is, the PI gain used in the feedback control using CA50 is set to be greater than the PI gain used in the feedback control using SA-CA10. For example, when the above-mentioned method using a moving average is used for the annealing process, the number of in-cylinder pressure data pieces used for the moving average in the feedback control using CA50 is smaller than the number of in-cylinder pressure data pieces used for the moving average in the feedback control using SA-CA10.

Figure 9:
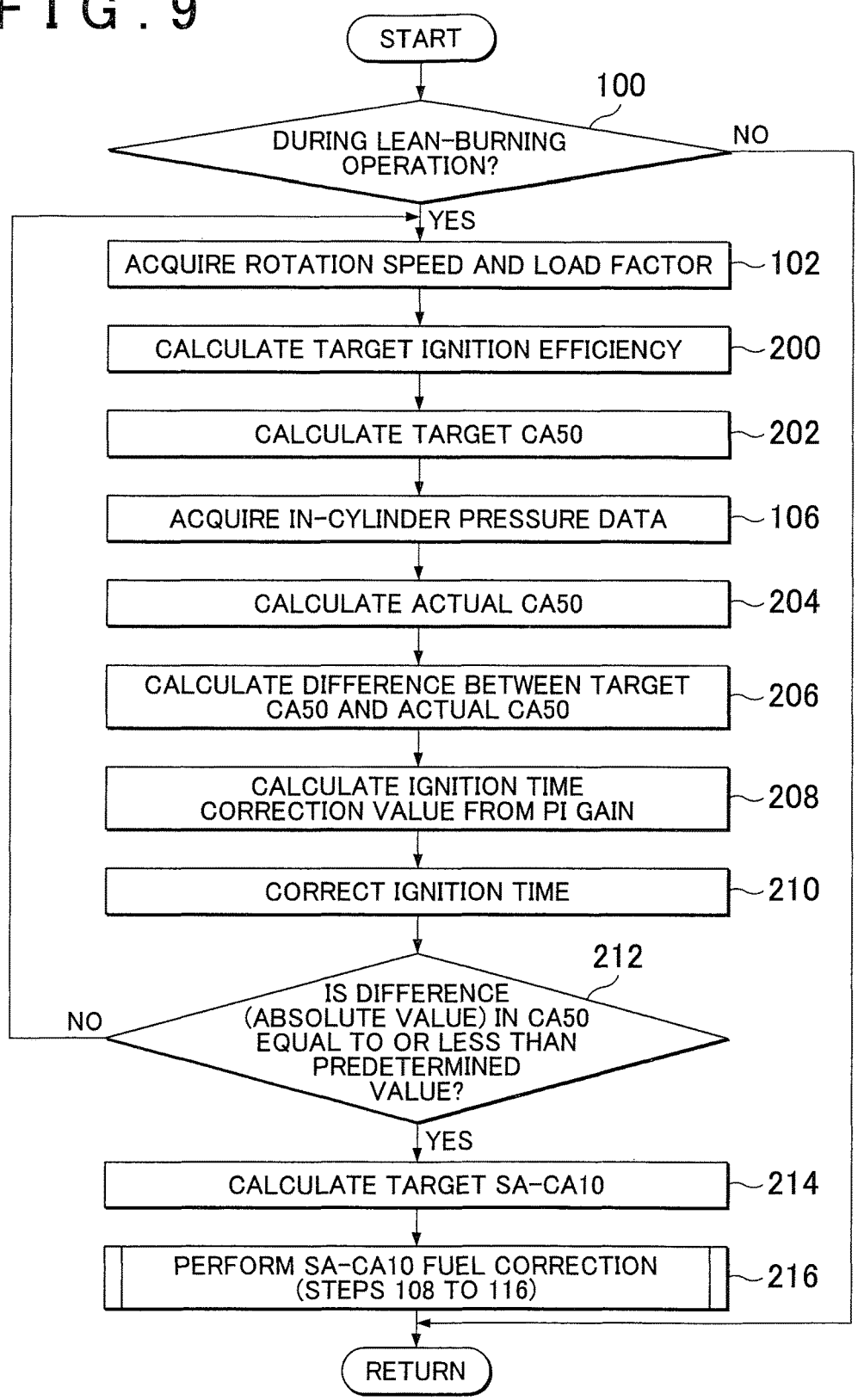
FIG. 9 is a flowchart illustrating a routine that is performed in Embodiment 2 of the invention.

FIG. 9 is a flowchart illustrating a control routine that is performed by the ECU 40 so as to implement the feedback control using SA-CA10 and the feedback control using CA50 in Embodiment 2 of the invention. In FIG. 9, the same steps as illustrated in FIG. 5 in Embodiment 1 will be referenced by the same reference signs and description thereof will not be repeated or will be made in brief.

In the routine illustrated in FIG. 9, the ECU 40 acquires target ignition efficiency (step 200) after acquiring the engine rotation speed and the engine load factor in step 102. The ECU 40 stores a map (not illustrated) in which the target ignition efficiency is determined depending on the operation condition of the internal combustion engine 10 and acquires the target ignition efficiency with reference to the map in step 200.

Then, the ECU 40 calculates a target CA50 (step 202). The target CA50 is set on the basis of the target ignition efficiency acquired in step 200 as well as the engine rotation speed and the engine load factor acquired in step 102. More specifically, when the target ignition efficiency is 1, that is, when the MBT is set as the target ignition time, CA50 at the time of obtaining the MBT is used as the target CA50. When the target ignition time is a predetermined value less than 1, that is, when the target ignition time is a predetermined time on an advance side or a delay side of the MBT, CA50 at the time of obtaining the predetermined time is used as the target CA50.

Then, after acquiring the in-cylinder pressure data in step 106, the ECU 40 calculates an actual CA50 using the analysis result of the acquired in-cylinder pressure data (step 204). In the calculation of the actual CA50, a predetermined annealing process is performed for the same reason as described above for the actual SA-CA10 in Embodiment 1. The consideration described with reference to FIG. 8 is taken for the annealing process. The ECU 40 calculates the difference between the target CA50 and the actual CA50 calculated in steps 202 and 204 (step 206).

Then, the ECU 40 calculates an ignition time correction value corresponding to the difference calculated in step 206 and the magnitude of an integrated value thereof using the difference and a predetermined PI gain (a proportional gain and an integral term gain) (step 208). As described above, the PI gain used in the feedback control using CA50 is set to be greater than the PI gain used in the feedback control using SA-CA10. The ECU 40 corrects the ignition time used in a subsequent cycle on the basis of the calculated ignition time correction value (step 210). Specifically, CA50 and the ignition time have almost one-to-one correspondence and when the actual CA50 is greater than the target CA50 (that is, when the actual CA50 is delayed from the target CA50), the ignition time moves to the advance side so as to advance the combustion.

Then, the ECU 40 determines whether the difference (absolute value) between the target CA50 and the actual CA50 is equal to or less than a predetermined value (step 212). As a result, when it is determined that the difference is greater than the predetermined value, that is, when it is determined that the actual CA50 does not sufficiently converge on the vicinity of the target CA50 by the feedback control of an ignition time using CA50, the ECU 40 returns the routine to step 102 and performs the process subsequent to step 102 again in a subsequent cycle. That is, in a cycle in which the determination result of step 212 is negative, the feedback control of an amount of fuel injected using SA-CA10, which is specified by the processes of steps 214 and 216, is not performed.

On the other hand, when the determination result of step 212 is positive, that is, when it is determined that the actual CA50 sufficiently converges on the vicinity of the target CA50 by the feedback control of an ignition time using CA50, the ECU 40 moves the routine to step 214 so as to perform the feedback control of an amount of fuel injected using SA-CA10 and calculates the target, SA-CA10. In the routine, unlike the routine illustrated in FIG. 5, the target SA-CA10 is set as a value based on the target ignition efficiency acquired in step 200 as well as the engine rotation speed and the engine load factor. More specifically, a reference value of the target SA-CA10 is set to a value when the MBT set on the basis of the engine rotation speed and the engine load factor is assumed. The final target SA-CA10 is set depending on the target ignition efficiency (that is, depending on the degree of separation of the target ignition time from the MBT). Still more specifically, the final target SA-CA10 is set to be smaller than the reference value as the degree of delay of the ignition time from the MBT becomes larger, and is set to be larger than the reference value as the degree of advance of the ignition time from the MBT becomes larger. Then, the ECU 40 performs the process of step 216. Step 216 generically includes steps 108 to 116 in the routine illustrated in FIG. 5.

According to the above-mentioned routine illustrated in FIG. 9, the feedback control of an amount of fuel injected using SA-CA10 and the feedback control of an ignition time using CA50 are performed. According to the feedback control of an ignition time, when the MBT varies with the variation in the air-fuel ratio through the control using SA-CA10, the ignition time can be appropriately controlled to the actual MBT using CA50 of which the value when the MBT is obtained hardly varies depending on the air-fuel ratio in the vicinity of the lean limit (that is, without considering the relationship between the MBT and the air-fuel ratio for the control of an ignition time). In other words, the displacement of the MBT due to the variation in the air-fuel ratio through the control using SA-CA10 can be corrected using CA50 which is not easily affected by the variation in the air-fuel ratio based on the control using SA-CA10. In this way, since the feedback control of both an amount of fuel injected (air-fuel ratio) and an ignition time can be performed in cooperation, it is possible to always realize optimal combustion. The target CA50 is set depending on the target ignition efficiency. Accordingly, even when an ignition time other than the MBT is used as the target ignition time under predetermined ignition efficiency, the displacement of the ignition time from the target ignition time due to the displacement of the MBT due to the above-mentioned factor can be corrected similarly.

According to the routine, the feedback control of an amount of fuel injected using SA-CA10 is performed only when the difference between the target CA50 and the actual CA50 is equal to or less than a predetermined value through the feedback control of an ignition time using CA50. As described above, the MBT varies with the variation in the air-fuel ratio due to the control using SA-CA10 (see FIG. 6) and the air-fuel ratio at the lean limit is affected by the ignition time (see FIG. 7). Nevertheless, when the feedback control using SA-CA10 and the feedback control using CA50 are independently performed freely, there is a possibility that the feedback controls will interfere with each other and it will be difficult to perform stable feedback control (for example, there is a possibility that a timing at which the air-fuel ratio will be controlled to an air-fuel ratio lower than the lean limit). In order to achieve cooperation of two feedback controls, it is preferable that the ignition time be stably controlled in the vicinity of the target ignition time such as the MBT before the feedback control of an amount of fuel injected using SA-CA10. As for the adjustment of the ignition time, a delay does not basically occur with respect to the combustion, but as for the adjustment of an amount of fuel injected (particularly, in case of port injection), a time difference is present until fuel is used for combustion after being injected. Accordingly, it is preferable in controllability that the feedback control of an amount of fuel injected be performed on the basis of the state where the feedback control of an ignition time sufficiently converges. As described above, it is possible to further stably perform two feedback controls by sequentially performing the two feedback controls that are implemented by the routine and it is possible to further appropriately control the air-fuel ratio in the vicinity of the lean limit through the use of the feedback controls, compared with the case where the feedback control using SA-CA10 is performed alone.

According to the routine, the response speed of the feedback control of an ignition time using CA50 is higher than the response speed of the feedback control of an amount of fuel injected using SA-CA10. When the responsiveness of the feedback control of an ignition time is not good, it is difficult to stably establish the determination of step 212 and it is thus to continuously perform the feedback control using SA-CA10. On the contrary, according to the above-mentioned routine, since the feedback control of an ignition time easily converges rapidly, it is easy to stably establish the determination of step 212. Accordingly, since the loop for performing two feedback controls is easily continuously established, it is possible to secure a lot of opportunities to perform the feedback control using SA-CA10 in a state where the ignition time converges on an appropriate value.

According to the above-mentioned routine, the target SA-CA10 is set depending on the target ignition efficiency, that is, depending on the degree of separation of the target ignition time from the MBT. As described above, the air-fuel ratio at the lean limit is affected by the ignition time (see FIG. 7). Accordingly, by setting the target SA-CA10 depending on the target ignition efficiency, it is possible to appropriately set the target SA-CA10 in consideration of the variation in the MBT due to the variation in the air-fuel ratio based on the feedback control using SA-CA10. As a result, it is possible to set the lean limit depending on the target ignition time (the MBT or a time advanced or delayed from the MBT) and to exhibit the potential of the internal combustion engine 10 as much as possible.

In Embodiment 2, the feedback control of an ignition time using CA50 is performed. However, ignition time adjusting means in the invention may adjust the ignition time using a maximum in-cylinder pressure crank angle ($\theta_{Pmax}$) instead of adjusting the ignition time using the combustion gravity center position (CA50). That is, the crank angle $\theta_{Pmax}$ at which the in-cylinder pressure is a maximum in a combustion period has a characteristic that it hardly varies with respect to the air-fuel ratio in the vicinity of the lean limit, similarly to the characteristic of CA50 described with reference to FIG. 6. Accordingly, the feedback control of an ignition time may be performed so as to make a difference between target $\theta_{Pmax}$ and actual $\theta_{Pmax}$ zero using $\theta_{Pmax}$ having such a characteristic, for example, through the use of the same method as described in Embodiment 2. $\theta_{Pmax}$ can be acquired using the in-cylinder pressure data acquired using the in-cylinder pressure sensor 30 and the crank angle sensor 42.

In Embodiment 2, the difference between the target CA50 and the actual CA50 corresponds to the "second difference". The difference between target $\theta_{Pmax}$ and actual $\theta_{Pmax}$ corresponds to the "third difference".

Embodiment 3 of the invention will be described below with reference to FIGS. 10 to 15. A system according to this embodiment can be implemented by employing the hardware configuration illustrated in FIG. 1 and causing the ECU 40 to perform the routine illustrated in FIGS. 13 to 15.

Figure 10:
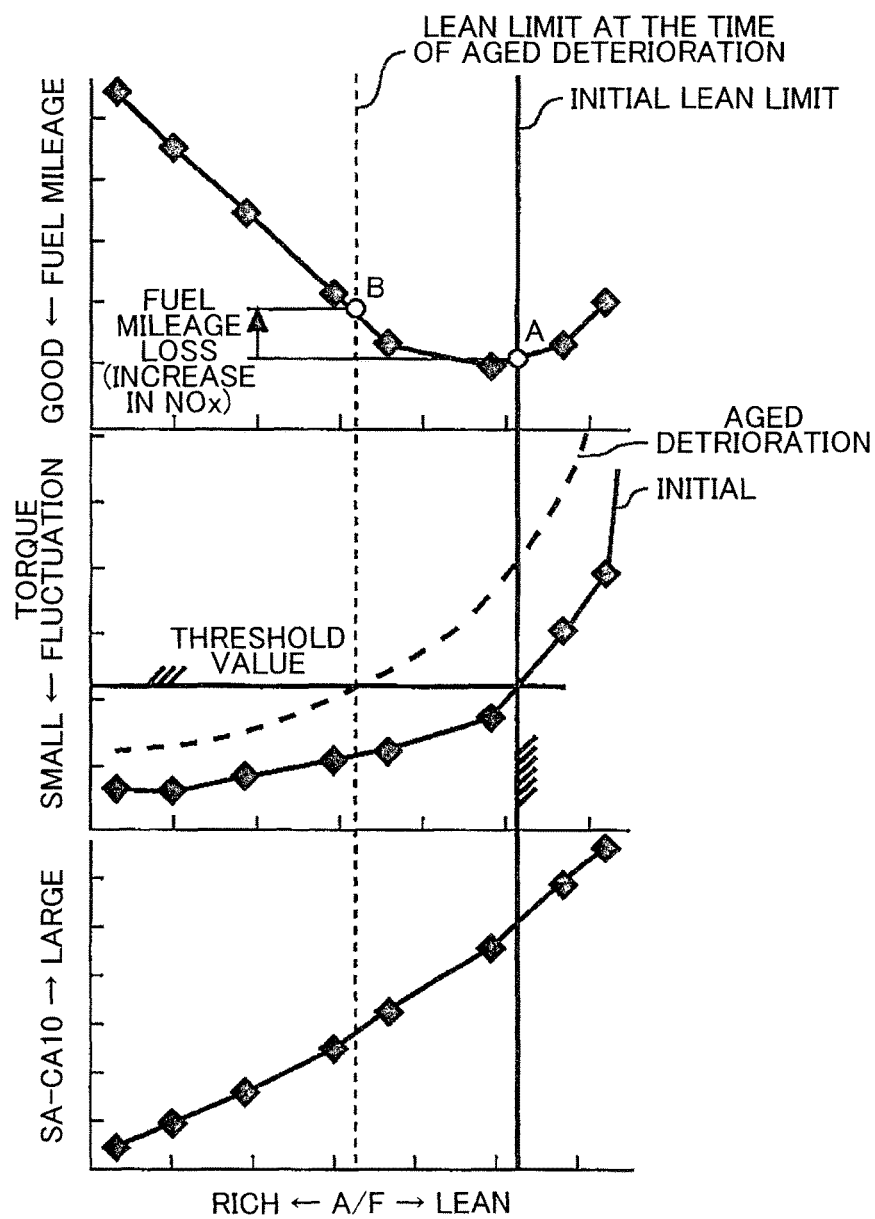
Figure 11:
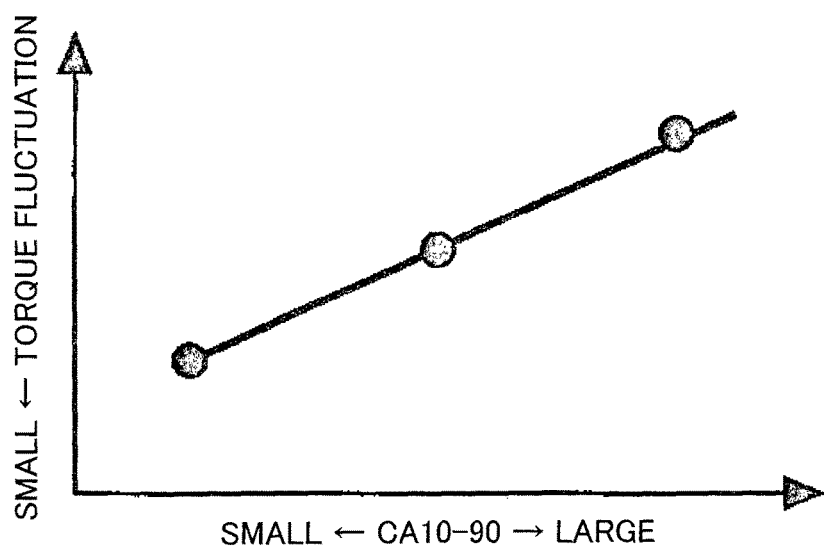
FIG. 11 is a diagram illustrating a relationship between a torque fluctuation and CA10-90.

FIG. 10 is a diagram illustrating a relationship between each of a fuel mileage, a torque fluctuation, and SA-CA10 and an air-fuel ratio (A/F), which is used to explain a variation in a lean limit due to an influence of aged deterioration or the like. FIG. 11 is a diagram illustrating a relationship between the torque fluctuation and CA10-90.

A main combustion rate (the length of the main combustion period (CA10-90)) can vary due to the aged deterioration of the internal combustion engine 10. The variation in the main combustion rate causes a variation in the lean limit. Here, an example of the aged deterioration is a case in which the main combustion rate is slowed in comparison with the initial engine state due to the variation in a tumble flow based on deposits on the wall surface of a cylinder. As illustrated in FIG. 10, when the main combustion rate is slowed down, the torque fluctuation at the same air-fuel ratio increases and thus the lean limit as an air-fuel ratio when the torque fluctuation reaches a limit varies to a rich-side value. Accordingly, as illustrated in FIG. 10, the fuel mileage degrades from the value of point A to the value of point B and the amount of NOx emitted also cases which are not illustrated herein.

When the variation in the lean limit is assumed and a target value of the lean limit control (the target SA-CA10 in this embodiment) is set with a margin, the fuel mileage is lost by the difference between the value of point A and the value of point B and the increase in the amount of NOx emitted is allowed from the first time. In order to avoid this problem, it is necessary to understand the engine state and to change the target value. However, there are many problems with the direction detection of the torque fluctuation using the above-mentioned method according to the related art. Therefore, in this embodiment, the torque fluctuation is detected during the operation using the following method and the target SA-CA10 is set so as to cause the air-fuel ratio to get as close as possible to the lean limit.

As illustrated in FIG. 11, the main, combustion period (defined by CA10-90 herein) and the torque fluctuation have a correlation. Specifically, the larger the CA10-90 becomes, the larger the torque fluctuation becomes. Accordingly, it is possible to understand the current degree of torque fluctuation on the basis of the CA10-90 (hereinafter, referred to as "actual CA10-90") obtained using the calculation result of the MFB based on the in-cylinder pressure data. Therefore, in this embodiment, the target SA-CA10 is changed on the basis of a difference ($\Delta$CA10-90) which is obtained by subtracting a predetermined target CA10-90 from the actual CA10-90. Although details will be described later with reference to FIG. 8, in the case illustrated in FIG. 6, that is, in the case where the actual CA10-90 (torque fluctuation) increases with the aged deterioration, the target SA-CA10 decreases so as to relatively change the air-fuel ratio, which is to be controlled in the vicinity of the lean limit, to a rich-side value.

In order to detect the torque fluctuation from the CA10-90 during the operation using the relationship illustrated in FIG. 11 accurately and without any particular correction, it is preferable that the ignition time be stably controlled to a target time. In FIG. 10, when the value of the SA-CA10 varies, the torque fluctuation also varies. Therefore, in this embodiment, the target SA-CA10 is changed on the basis of $\Delta$CA10-90 in the state where the difference between the target CA50 and the actual CA50 is equal to or less than a predetermined value $CA_{th1}$ through the feedback control of an ignition time using CA50 and the difference between the target SA-CA10 and the actual SA-CA10 is equal to or less than a predetermined value $CA_{th1}$ through the feedback control of an amount of fuel injected using SA-CA10. In the order in which the feedback control using CA50 and the feedback control using SA-CA10 are performed, instead of freely performing the feedback control of an amount of fuel injected using SA-CA10, the feedback control of an amount of fuel injected using SA-CA10 is performed after the difference between the target CA50 and the actual CA50 is equal to or less than the predetermined value $CA_{th1}$ through the feedback control of an ignition time using CA50.

Figure 12:
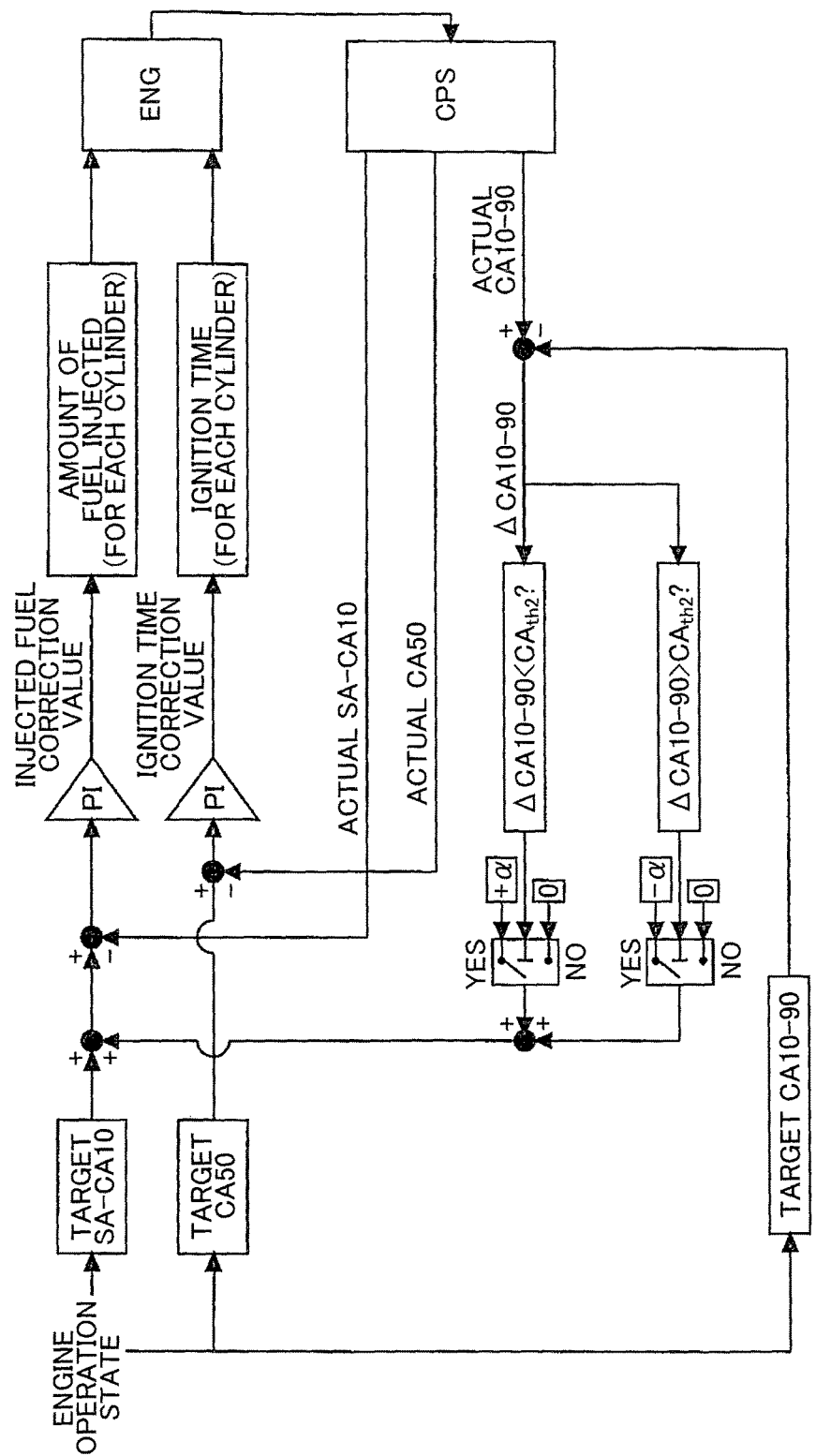
FIG. 12 is a block diagram illustrating the outline of a variety of feedback controls according to Embodiment 3 of the invention.

FIG. 12 is a block diagram illustrating the outline of a variety of feedback control according to Embodiment 3 of the invention. First, in the feedback control using SA-CA10, a target SA-CA10 based on the engine operation state (specifically, the engine rotation speed, the engine load factor, and the target ignition efficiency) is set as illustrated in FIG. 12. The actual SA-CA10 is calculated for each cycle for each cylinder on the basis of the analysis result of the in-cylinder pressure data.

In the feedback control, for example, PI control is used to adjust the amount of fuel injected so as to make the difference between the target SA-CA10 and the actual SA-CA10 zero. In the PI control, an injected fuel correction value corresponding to the difference between the target SA-CA10 and the actual SA-CA10 and the magnitude of the integrated value thereof is calculated using the difference and a predetermined PI gain (a proportional gain and an integral term gain). The injected fuel correction value calculated for each cylinder is reflected in the amount of fuel injected of the corresponding cylinder. Accordingly, the amount of fuel injected supplied to each cylinder of the internal combustion engine (ENG) 10 is adjusted (corrected) by the feedback control.

Since the actual SA-CA10 acquired on the basis of the analysis result of the in-cylinder pressure data as described above includes a predetermined irregularity (a combustion fluctuation that essentially occurs), a raw value may be used, but the injected fuel correction value is not stabilized in this case. Accordingly, a value obtained after the combustion fluctuation is removed by performing a predetermined annealing process on the actual SA-CA10 is used for the feedback control of the amount of fuel injected. For example, a method of taking a time-series moving average of a predetermined number of calculated values of the actual SA-CA10 closest to each other and including the currently-calculated value can be used as the annealing process. Instead of the annealing process, an irregularity amplitude equivalent to the calculated value of the actual SA-CA10 based on the assumed combustion fluctuation may be set as a control dead zone. That is, when the difference between the target SA-CA10 and the actual SA-CA10 to be described later is equal to or less than the irregularity amplitude equivalent, the amount of fuel injected may not be corrected.

The feedback control of CA50 will be described below. The feedback control is to adjust the ignition time on the basis of the difference between the target CA50 and the actual CA50 (more specifically, so as to make the difference zero) as described above. In order to correct the ignition time so as to make the difference between the target CA50 and the actual CA50 zero, for example, PI control is used for the feedback control using CA50. In the PI control, an ignition time correction value corresponding to the difference between the target CA50 and the actual CA50 and the magnitude of the integrated value thereof is calculated using the difference and a predetermined PI gain (a proportional gain and an integral term gain). The ignition time correction value calculated for each cylinder is reflected in the ignition time of the corresponding cylinder. Accordingly, the ignition time for each cylinder of the internal combustion engine (ENG) 10 is adjusted (corrected) by the feedback control. In the calculation of the actual CA50, a predetermined annealing process is performed for the same reason as described above for the actual SA-CA10.

The target SA-CA10 can be changed depending on ΔCA10-90 as illustrated in FIG. 12. More specifically, the target SA-CA10 is changed with respect to the value set on the basis of the engine operation state depending on whether ΔCA10-90 which is the difference between the actual CA10-90 based on the analysis result of the in-cylinder pressure data and the target CA10-90 set to the value based on the engine operation state is less or greater than a predetermined value $CA_{th2}$.

When ΔCA10-90 is less than the predetermined value $CA_{th2}$, that is, when the actual CA10-90 is relatively small and the main combustion speed is sufficiently high, the control using SA-CA10 has a margin for the lean limit. Therefore, in this case, a predetermined value a is added to the target SA-CA10 set depending on the engine operation state so as to cause the actual SA-CA10 to get closer to the lean limit. When the control using SA-CA10 is performed for the adjustment of an amount of fuel injected or an amount of intake air, the getting of the actual SA-CA10 closer to the lean limit means that the air-fuel ratio gets closer to the lean limit.

On the other hand, when ΔCA10-90 is greater than the predetermined value $CA_{th2}$, that is, when the actual CA10-90 is great (the torque fluctuation is great because the combustion rate is low), the control using SA-CA10 has a large margin for the lean limit. Therefore, in this case, the predetermined value a is subtracted from the value of the target SA-CA10 set depending, on the engine operation state so as to separate the actual SA-CA10 apart from the lean limit. Accordingly, when the control using SA-CA10 is performed for the adjustment of an amount of fuel injected or an amount of intake air, the air-fuel ratio is controlled to a rich-side value.

As for the change of the target SA-CA10 based on ΔCA10-90, the variation in CA10-90 varying slowly like the aged deterioration is mainly assumed. Therefore, the change of the target SA-CA10 may be frequently performed like the processes of the routine illustrated in FIG. 13, but only has to be basically performed by processes much slowly than the above-mentioned processes. That is, for example, the predetermined value (α or −α) used to change the target SA-CA10 may be stored as a learned value obtained through a learning process that is performed in a span much longer than the two feedback controls and the learned value may be reflected in the target SA-CA10 at the time of setting the target SA-CA10 depending on the engine operation state. In the calculation of the actual CA10-90, a predetermined annealing process is performed for the same reason as described above for the actual SA-CA10 or the like. When the above-mentioned method using a moving average is used for the annealing process, the number of in-cylinder pressure data pieces used for the moving average in the feedback control using CA10-90 is much greater than the number of in-cylinder pressure data pieces used for the moving average for calculating the actual SA-CA10 and the actual CA50.

Figure 13A:
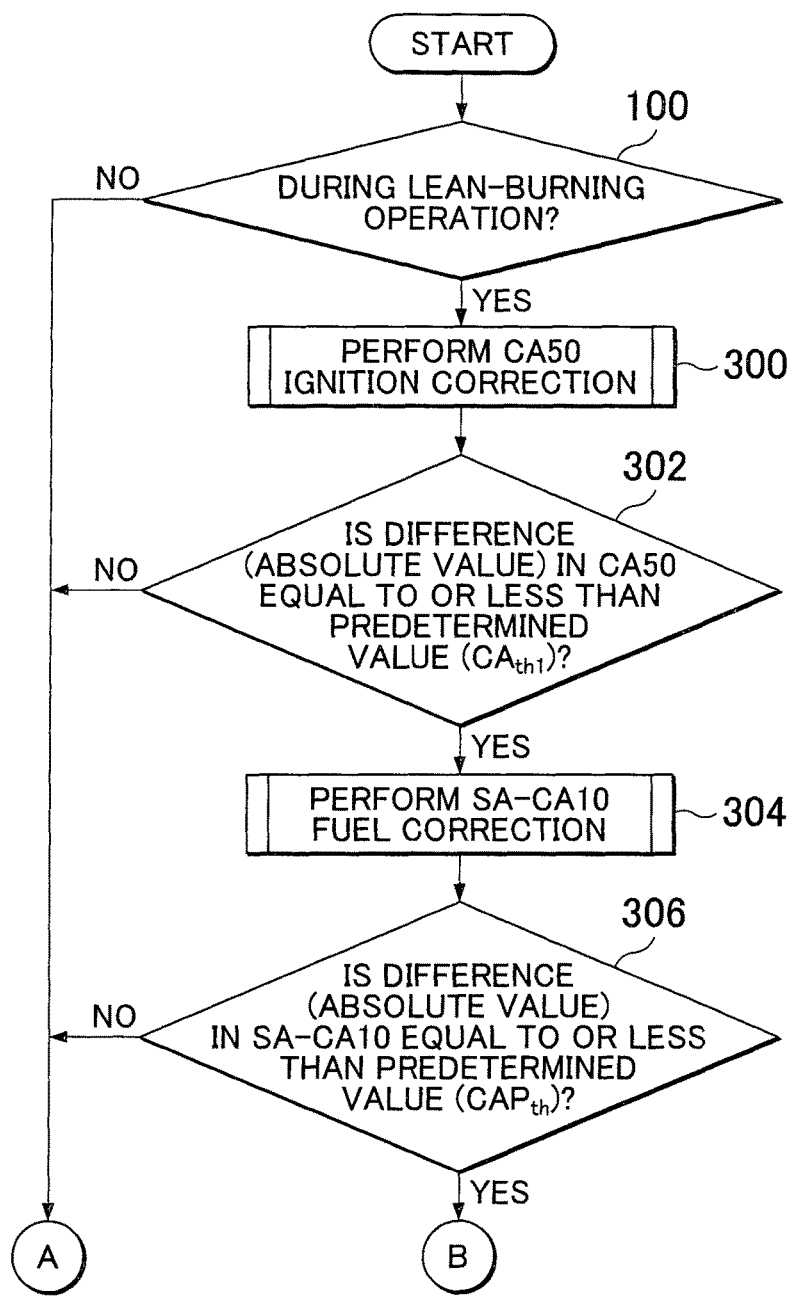
FIG. 13 is a flowchart illustrating a routine that is performed in Embodiment 3 of the invention.
Figure 13B:
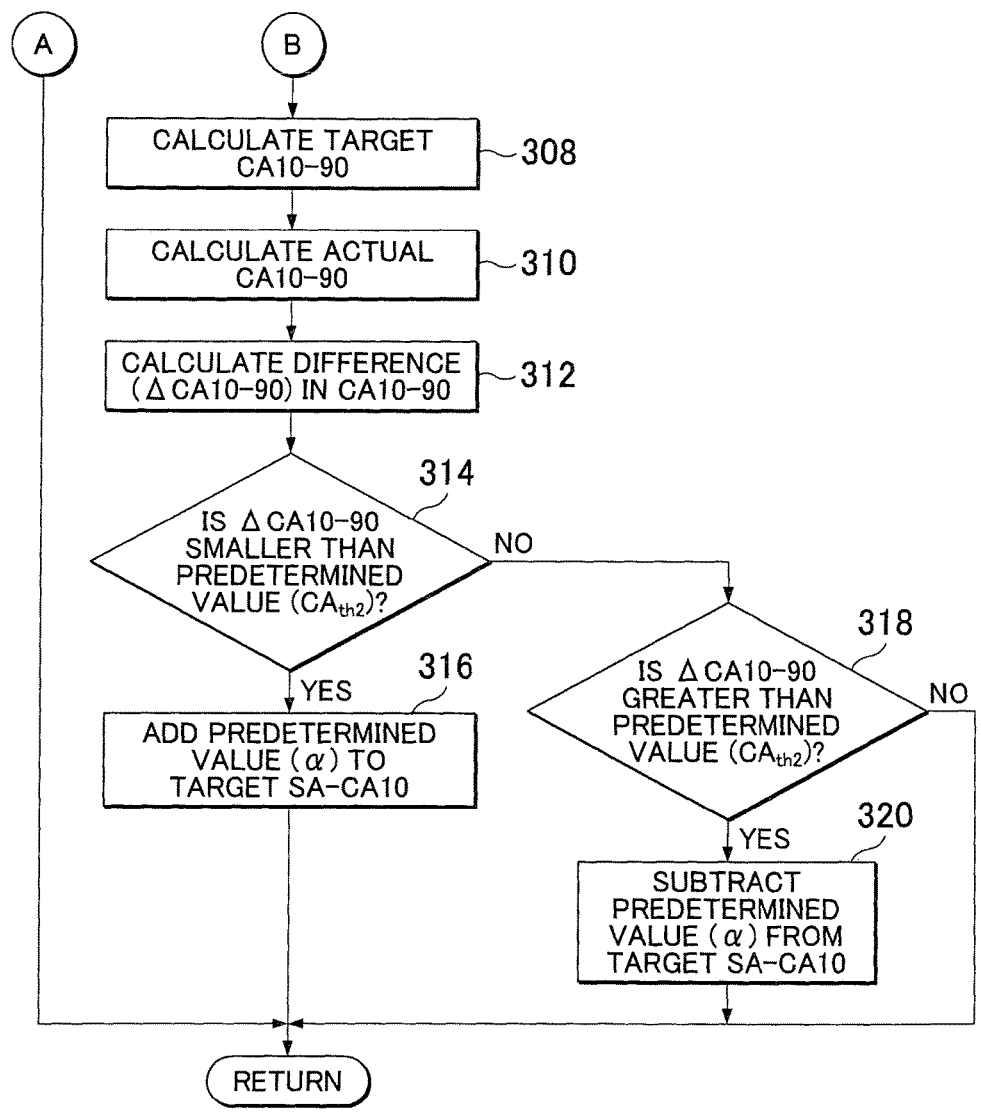
Figure 14:
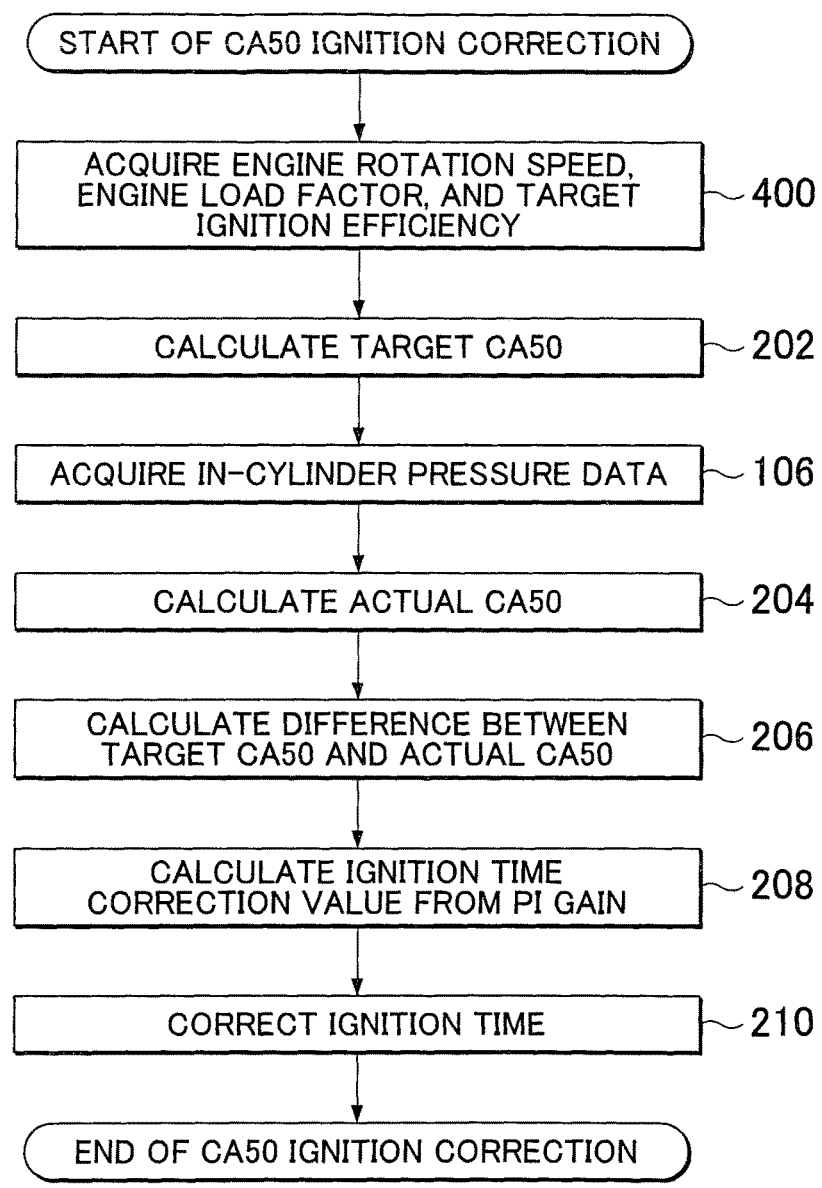
FIG. 14 is a flowchart illustrating a main routine that is performed in Embodiment 3 of the invention.
Figure 15:
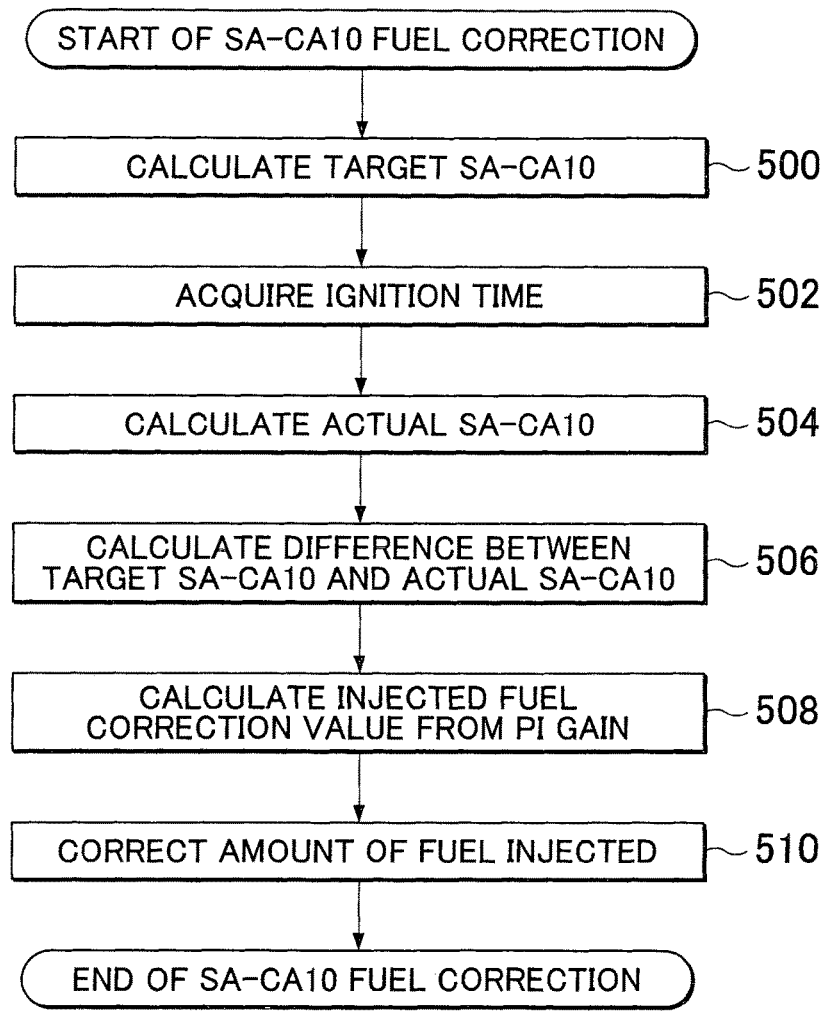
FIG. 15 is a flowchart illustrating a subroutine that is performed in Embodiment 3 of the invention.

FIG. 13 is a flowchart illustrating a main routine that is performed by the ECU 40 so as to implement the lean limit control according to Embodiment 3 of the invention. FIG. 14 is a flowchart illustrating a subroutine routine in which processes of the feedback control of an ignition time using CA50 are prescribed. FIG. 15 is a flowchart illustrating a subroutine routine in which processes of the feedback control of an amount of fuel injected using SA-CA10 are prescribed. The routine illustrated in FIG. 13 is repeatedly performed every cycle at a predetermined time after the combustion finishes in each cylinder.

In the main routine illustrated in FIG. 13, the ECU 40 first determines whether a lean-burning operation is being performed (step 100). The internal combustion engine 10 performs a lean-burning operation at an air-fuel ratio lower than a theoretical air-fuel ratio in a predetermined operation area. Here, it is determined whether the current operation area corresponds to the operation area in which the lean-burning operation is performed.

When it is determined in step 100 that the lean-burning operation is being performed, the ECU 40 moves the routine to step 300 and performs a series of processes of the subroutine illustrated in FIG. 14. That is, the ECU 40 acquires the engine rotation speed and the engine load factor using the crank angle sensor 42 and the air flow meter 44 and acquires the target ignition efficiency (step 400). The engine load factor can be calculated on the basis of the engine rotation speed and the amount of intake air. The ECU 40 stores a map (not illustrated) in which the target ignition efficiency is determined depending on the operation condition of the internal combustion engine 10 and acquires the target ignition efficiency with reference to the map in step 400.

Then, the ECU 40 calculates a target CA50 (step 202). The target CA50 is set on the basis of the engine rotation speed, the engine load factor, and the target ignition efficiency acquired in step 400. More specifically, when the target ignition efficiency is 1, that is; when the MBT is set as the target ignition time, CA50 at the time of obtaining the MBT is used as the target CA50. When the target ignition time is a predetermined value less than 1, that is, when the target ignition time is a predetermined time on an advance side or a delay side of the MBT, CA50 at the time of obtaining the predetermined time is used as the target CA50.

Then, the ECU 40 acquires the in-cylinder pressure data measured using the in-cylinder pressure sensor 30 and the crank angle sensor 42 (in step 106). Then, the ECU 40 calculates an actual CA50 using the analysis result of the acquired in-cylinder pressure data (step 204). In the calculation of the actual CA50, a predetermined annealing process taking the consideration described above with reference to FIG. 8 is performed.

The ECU 40 calculates the difference between the target CA50 and the actual CA50 calculated in steps 202 and 204 (step 206). Then, the ECU 40 calculates an ignition time correction value corresponding to the difference calculated in step 206 and the magnitude of an integrated value thereof using the difference and a predetermined PI gain (a proportional gain and an integral term gain) (step 208). As described above, the PI gain used in the feedback control using CA50 is set to be greater than the PI gain used in the feedback control using SA-CA10. The ECU 40 corrects the ignition time used in a subsequent cycle on the basis of the calculated ignition time correction value (step 210). Specifically, CA50 and the ignition time have almost one-to-one correspondence and when the actual CA50 is greater than the target CA50 (that is, when the actual CA50 is delayed from the target CA50), the ignition time moves to the advance side so as to advance the combustion.

Then, after performing the process, of step 300 in the main routine illustrated in FIG. 13, the ECU 40 determines whether the difference (absolute value) between the target CA50 and the actual CA50 is equal to or less than a predetermined value $CA_{th1}$ (step 302). As a result, when it is determined that the difference is greater than the predetermined value $CA_{th1}$, that is, when it is determined that the actual CA50 does not sufficiently converge on the vicinity of the target CA50 by the feedback control of an ignition time using CA50, the ECU 40 rapidly ends the processes in the current cycle. As a result, the processes of step 300 or the steps subsequent thereto are performed again in a subsequent cycle in the same cylinder on the assumption that step 100 is established. That is, in a cycle in which the determination result of step 302 is negative, the subsequent processes of the feedback control of an amount of fuel injected using SA-CA10, which is specified by the process of step 304, is not performed.

On the other hand, when the determination result of step 302 is positive, that is, when it is determined that the actual CA50 sufficiently converges on the vicinity of the target CA50 by the feedback control of an ignition time using CA50, the ECU 40 moves the routine to step 304 so as to perform the feedback control of an amount of fuel injected using SA-CA10.

In step 304, the series of processes of the subroutine illustrated in FIG. 15 are performed. That is, the ECU 40 first calculates a target SA-CA10 (step 500). The ECU 40 stores a map (not illustrated) in which the target SA-CA10 is determined in advance in correlation with the engine rotation speed, the engine load factor, and the target ignition efficiency on the basis of experiment results or the like. In step S500, the target SA-CA10 is acquired on the basis of the engine rotation speed; the engine load factor, and the target ignition efficiency acquired in step 500 with reference to the map. Regarding the correlation with the target ignition time, depending on the target ignition efficiency (that is, depending on the degree of separation of the target ignition time from the MBT), the target SA-CA10 is set to be smaller than a reference value as the degree of delay of the ignition time from the MBT becomes larger, and is set to be larger than the reference value as the degree of advance of the ignition time from the MBT becomes larger.

Then, the ECU 40 acquires an ignition time (step 502). The ECU 40 stores a map (not illustrated) in which a target (request) ignition time (basically, optimal ignition time (hereinafter, referred to as "MBT")) is determined in correlation with the engine load factor and the engine rotation speed and acquires the ignition time with reference to the map in step S502.

Then, the ECU 40 calculates an actual SA-CA10 (step 504). The actual SA-CA10 is calculated as a crank angle period from the ignition time acquired in step 502 to CA10 obtained as the analysis result of the in-cylinder pressure data acquired in step 504.

Then, the ECU 40 calculates the difference between the target SA-CA10 and the actual SA-CA10 which are calculated in steps 500 and 504 (step 506). Then, the ECU 40 calculates the injected fuel correction value based on the calculated difference between the target SA-CA10 and the actual SA-CA10 and the integrated value thereof using the difference and a predetermined PI gain (a proportional gain and an integral term gain) (step 508). The ECU 40 corrects the amount of fuel injected to be used in a subsequent cycle on the basis of the calculated injected fuel correction value (step 510). Specifically, for example, when the actual SA-CA10 is greater than the target SA-CA10, the air-fuel ratio is inclined to the lean side than the target value from the relationship illustrated in FIG. 3 and thus the amount of fuel injected increases from the base value of the amount of fuel injected so as to correct the air-fuel ratio to the rich side.

Then, after performing the process of step 304 in the main routine illustrated in FIG. 13, the ECU 40 determines whether the difference (absolute value) between the target SA-CA10 and the actual. SA-CA10 is equal to or less than a predetermined value $CAP_{th}$ (step 306). As a result, when it is determined that the difference is greater than the predetermined value $CAP_{th}$, that is, when it is determined that the actual SA-CA10 does not sufficiently converge on the vicinity of the target SA-CA10 by the feedback control of an amount of fuel injected using SA-CA10, the ECU 40 rapidly ends the processes in the current cycle. As a result, the processes of step 300 or the steps subsequent thereto are performed again in a subsequent cycle in the same cylinder on the assumption that step 100 is established. That is, in a cycle in which the determination result of step 306 is negative, the processes of step 308 and the steps subsequent thereto are not performed.

On the other hand, when the determination result of step 306 is positive, that is, when it is determined that the actual SA-CA10 sufficiently converges on the vicinity of the target SA-CA10 by the feedback control of an amount of fuel injected using SA-CA10, the ECU 40 moves the routine to step 308 so as to perform the process for correcting the target SA-CA10 using CA10-90.

In step 308, the ECU 40 calculates a target CA10-90. Similarly to the target CA50, the target CA10-90 is set on the basis of the engine rotation speed, the engine load factor, and the target ignition efficiency acquired in step 400. More specifically, when the target ignition efficiency is 1, that is, when the MBT is set as the target ignition time, CA10-90 at the time of obtaining the MBT is used as the target CA10-90. When the target ignition time is a predetermined value less than 1, that is, when the target ignition time is a predetermined time on an advance side or a delay side of the MBT, CA10-90 at the time of obtaining the predetermined time is used as the target CA10-90.

Then, the ECU 40 calculates an actual CA10-90 using the analysis result of the in-cylinder pressure data acquired in step 106 (step 310). In the calculation of the actual CA10-90, a predetermined annealing process taking the consideration described above with reference to FIG. 8 is performed.

Then, the ECU 40 calculates ΔCA10-90 which is a difference between the target CA10-90 and the actual CA10-90 calculated in steps 308 and 310 (step 312). Then, the ECU 40 determines whether the calculated ΔCA10-90 is smaller than a predetermined value $CA_{th2}$ (step 314). The predetermined value $CA_{th2}$ is a value set in advance as a threshold value for determining the magnitude (the magnitude of the main combustion rate) of the actual CA10-90 with respect to the target CA10-90 depending on the engine operation state (here, the engine rotation speed, the engine load factor, and the target ignition efficiency).

When the determination result of step 314 is positive, that is, when the actual CA10-90 is relatively small and the main combustion rate can be said to be sufficiently high, the ECU 40 adds a predetermined value a to the value of the target SA-CA10 calculated in step 500 (step 316).

On the other hand, when the determination result of step 314 is negative, the ECU 40 determines whether ΔCA10-90 is greater than the predetermined value $CA_{th2}$ (step 318). As a result, when the determination result of step 318 is positive, that is, when the actual CA10-90 is great (the main combustion rate is low), the ECU 40 subtracts the predetermined value a from the value of the target SA-CA10 calculated in step 500 (step 320).

The advantages of the above-mentioned lean limit control based on the processes of the routines illustrated in FIGS. 13 to 15 will be described below.

According to the above-mentioned processes of the subroutine illustrated in FIG. 15 as the main part of the lean limit control according to this embodiment, the feedback control is performed so as to make the difference between the target SA-CA10 and the actual SA-CA10 zero. As described above, SA-CA10 has linearity with respect to the air-fuel ratio even in the vicinity of the lean limit. Unlike the method according to this embodiment, when the amount of fuel injected is adjusted so that a specified crank angle is equal to the target value using only the specified crank angle at the time of reaching a predetermined mass fraction burned, the following problem occurs. That is, when the ignition time varies, the specified crank angle at the time of obtaining a predetermined mass fraction burned varies accordingly. On the contrary, even when the ignition time varies, the crank angle period from the ignition time to the specified crank angle hardly varies. Accordingly, by using the crank angle period (SA-CA10 in this embodiment) as an index for adjusting the amount of fuel injected, it is possible to exclude the influence of the ignition time and to suitably understand the correlation with respect to the air-fuel ratio, compared with the case where only the specified crank angle period is used. In an operation requiring precise combustion control such as the lean-burning operation or the EGR operation in which a large amount of EGR gas is introduced, there is a problem in that it is difficult to accurately control the air-fuel ratio in the vicinity of the lean limit by the current air-fuel ratio control using an air-fuel ratio sensor. Therefore, by adjusting the amount of fuel injected on the basis of the difference between the target SA-CA10 and the actual SA-CA10 using the method according to this embodiment, it is possible to suitably control the air-fuel ratio in the vicinity of the lean limit in the lean-burning operation.

Since the method according to this embodiment dues not use the statistical process like the above-mentioned method according to the related art, it is possible to perform quick feedback control using the method according to this embodiment. Accordingly, it is possible to apply the method according to this embodiment to a transient operation. As a result, according to the method according to this embodiment, it is possible to implement the lean limit control under wide operation conditions and thus to exhibit fuel mileage performance and exhaust emission performance. It is also possible to perform the control for each cylinder.

In the method according to this embodiment, the target SA-CA10 is set on the basis of the engine rotation speed, the engine load factor, and the target ignition efficiency. Accordingly, it is possible to appropriately set the target SA-CA10 in consideration of the influence of the variations in the engine rotation speed; the engine load factor, and the target ignition efficiency. As described above, the air-fuel ratio at the lean limit is affected by the ignition time (see FIG. 7). Accordingly, by setting the target SA-CA10, particularly, depending on the target ignition efficiency (that is, depending on the degree of separation of the target ignition time from the MBT), it is possible to appropriately set the target SA-CA10 in consideration of the variation in the MBT due to the variation in the air-fuel ratio based on the feedback control using SA-CA10. As a result, it is possible to set the lean limit depending on the target ignition time (the MBT or a time advanced or delayed from the MBT) and to exhibit the potential of the internal combustion engine 10 as much as possible.

According to the processes of the main routine illustrated in FIG. 13, the target SA-CA10 is corrected depending on whether ΔCA10-90 is smaller or greater than the predetermined value $CA_{th2}$ (that is, depending on the magnitude of the actual CA10-90). More specifically, the target SA-CA10 is changed to a larger value (a value closer to a lean side as the air-fuel ratio) as ΔCA10-90 becomes smaller (the actual CA10-90 becomes smaller), that is, the target SA-CA10 is changed to a smaller value (a value closer to a rich side as the air-fuel ratio) as ΔCA10-90 becomes larger (the actual CA10-90 becomes larger). Accordingly, even when the main combustion period (CA10-90) varies due to the aged deterioration or the like and thus the torque fluctuation limit varies, it is possible to select an appropriate lean limit depending on the variation in the main combustion period. Particularly, as in the related art, it is not necessary to assume an increase in the torque fluctuation due to the aged deterioration and to provide a margin for the target SA-CA10. As a result, it is possible to set an appropriate lean limit from the initial state and thus to prevent a fuel mileage loss and an increase in an amount of NOx emitted due to the margin in the initial state. Even when the ignition is performed as designed but the main combustion period extends due to the aged deterioration, it is possible to select an appropriate lean limit without deteriorating the torque fluctuation by correcting the target SA-CA10 using CA10-90.

According to the above-mentioned processes of the subroutine illustrated in FIG. 14, the feedback control of an amount of fuel injected using SA-CA10 and the feedback control of an ignition time using CA50 are performed. According to the feedback control of an ignition time, when the MBT varies with the variation in the air-fuel ratio through the control using SA-CA10, the ignition time can be appropriately controlled to the actual MBT using CA50 of which the value when the MBT is obtained hardly varies depending on the air-fuel ratio, in the vicinity of the lean limit (that is, without considering the relationship between the MBT and the air-fuel ratio for the control of an ignition time). In other words, the displacement of the MBT due to the variation in the air-fuel ratio through the control using SA-CA10 can be corrected using CA50 which is not easily affected by the variation in the air-fuel ratio based on the control using SA-CA10. In this way, since the feedback control of both an amount of fuel injected (air-fuel ratio) and an ignition time can be performed in cooperation, it is possible to always realize optimal combustion. The target CA50 is set depending on the target ignition efficiency. Accordingly, even when an ignition time other than the MBT is used as the target ignition time under predetermined ignition efficiency, the displacement of the ignition time from the target ignition time due to the displacement of the MBT due to the above-mentioned factor can be corrected similarly.

According to the main routine illustrated in FIG. 13, the feedback control of an amount of fuel injected using SA-CA10 is performed only when the difference between the target CA50 and the actual CA50 is equal to or less than a predetermined value through the feedback control of an ignition time using CA50. As described above, the MBT varies with the variation in the air-fuel ratio due to the control using SA-CA10 (see FIG. 6) and the air-fuel ratio at the lean limit is affected by the ignition time (see FIG. 7). Nevertheless, when the feedback control using SA-CA10 and the feedback control using CA50 are independently performed freely, there is a possibility that the feedback controls will interfere with each other and it will be difficult to perform stable feedback control (for example, there is a possibility that a timing at which the air-fuel ratio will be controlled to an air-fuel ratio lower than the lean limit). In order to achieve cooperation of two feedback controls, it is preferable that the ignition time be stably controlled in the vicinity of the target ignition time such as the MBT before the feedback control of an amount of fuel injected using SA-CA10. As for the adjustment of the ignition time, a delay does not basically occur with respect to the combustion, but as for the adjustment of an amount of fuel injected (particularly, in case of port injection), a time difference is present until fuel is used for combustion after being injected. Accordingly, it is preferable in controllability that the feedback control of an amount of fuel injected be performed on the basis of the state where the feedback control of an ignition time sufficiently converges. As described above, it is possible to further stably perform two feedback controls by sequentially performing the two feedback controls that are implemented by the routine and it is possible to further appropriately control the air-fuel ratio in the vicinity of the lean limit through the use of the feedback controls, compared with the case where the feedback control using SA-CA10 is performed alone.

In the technique according to this embodiment, the response speed of the feedback control of an ignition time using CA50 is higher than the response speed of the feedback control of an amount of fuel injected using SA-CA10. When the responsiveness of the feedback control of an ignition time is not good, it is difficult to stably establish the determination of step 302 and it is thus to continuously perform the feedback control using SA-CA10. On the contrary, according to the above-mentioned routine, since the feedback control of an ignition time easily converges rapidly, it is easy to stably establish the determination of step 302. Accordingly, since the loop for performing two feedback controls is easily continuously established, it is possible to secure a lot of opportunities to perform the feedback control using SA-CA10 in a state where the ignition time converges on an appropriate value.

According to the main routine illustrated in FIG. 13, only when the determination results of both steps 302 and 306 are positive, the correction of the target SA-CA10 based on CA10-90 is performed on the condition that the determination result of step 314 or 318 is positive.

As described above, the MBT varies with the variation in the air-fuel ratio based on the control using SA-CA10 (see FIG. 6) and the air-fuel ratio at the lean limit is affected by the ignition time (see FIG. 7). Accordingly, by changing the target SA-CA10 based on CA10-90 in a state where the determination result of step 302 is positive (that is, in a state where the ignition time converges on an appropriate value through the feedback control of an ignition time using CA50), it is possible to further appropriately set the target SA-CA10 on the basis of CA10-90 without being affected by the displacement of the MBT due to the variation in the air-fuel ratio based on the control using SA-CA10.

When the actual SA-CA10 does not sufficiently converge on the vicinity of the target SA-CA10 by the feedback control, there is a possibility that the variation in the ignition delay due thereto will affect the main combustion period. Accordingly, by changing the target SA-CA10 based on CA10-90 in the state where the determination result of step 306 is positive (that is, in the state where SA-CA10 converges on an appropriate value through the feedback control of an amount of fuel injected using SA-CA10), it is possible to remove the influence due to the insufficient feedback control using SA-CA10 and thus to further accurately understand the length of the main combustion period due to the aged deterioration on the basis of ΔCA10-90 (the actual CA10-90). Accordingly, it is possible to further appropriately set the target SA-CA10 on the basis of CA10-90.

In Embodiment 3, the amount of fuel injected is adjusted using the feedback control so as to make the difference between the target SA-CA10 and the actual SA-CA10 zero in the lean limit control using SA-CA10. However, in the invention, the adjustment based on the first difference between a crank angle period from the ignition time to a specified crank angle at the time of obtaining a predetermined mass fraction burned and a target crank angle period as a target value of the crank angle period may be performed on an amount of intake air or ignition energy instead of the amount of fuel injected. Two or more of the amount of fuel injected, the amount of intake air, or the ignition energy may be subjected to the adjustment. Specifically, when the actual SA-CA10 is greater than the target SA-CA10, the amount of intake air is decreased to correct the air-fuel ratio to a rich side in the adjustment of the amount of intake air, or the ignition energy is increased to shorten the ignition delay in the adjustment of the ignition energy. Here, for example, the adjustment of the amount of intake air is preferably performed using a known variable intake valve capable of controlling an amount of air introduced into a cylinder in each cycle with a high response speed. The adjustment of the ignition energy can be performed, for example, by providing plural ignition coils for the ignition plug 28 and changing the number of ignition coils used for discharge if necessary. When the amount of fuel injected or the amount of intake air is subjected to the adjustment, the air-fuel ratio is directly controlled by this control.

In Embodiment 3, the feedback control of an ignition time using CA50 is performed. However, ignition time adjusting means in the invention may adjust the ignition time using a maximum in-cylinder pressure crank angle ($\theta_{Pmax}$) instead of adjusting the ignition time using the combustion gravity center position (CA50). That is, the crank angle $\theta_{Pmax}$ at which the in-cylinder pressure is a maximum in a combustion period has a characteristic that it hardly varies with respect to the air-fuel ratio in the vicinity of the lean limit, similarly to the characteristic of CA50 described with reference to FIG. 6. Accordingly, the feedback control of an ignition time may be performed so as to make a difference between target $\theta_{Pmax}$ and actual $\theta_{Pmax}$ zero using $\theta_{Pmax}$ having such a characteristic, for example, through the use of the same method as described in Embodiment 3. $\theta_{Pmax}$ can be acquired using the in-cylinder pressure data acquired using the in-cylinder pressure sensor 30 and the crank angle sensor 42.

In Embodiment 3, the target SA-CA10 is corrected depending on whether ΔCA10-90 is smaller or greater than the predetermined value $CA_{th2}$. However, the target value of the crank angle period or the correlation value thereof based on the length of the main combustion period in the invention is not limited to the change depending on the magnitude of ΔCA10-90. That is, the target value may be based on the comparison result of the actual CA10-90 with a predetermined value, as long as it is changed depending on the length of the main combustion period. The predetermined value is preferably set to a value based on the engine operation state (such as the engine rotation speed, the engine load factor, or the target ignition efficiency).

Embodiment 4 of the Invention will be described below with reference to FIGS. 16 and 17. A system according to this embodiment can be implemented by employing the hardware configuration illustrated in FIG. 1 and causing the ECU 40 to perform the routine illustrated in FIG. 17.

In Embodiment 3, the target SA-CA10 is changed on the basis of CA10-90. On the contrary, in this embodiment, an ignition limit is further considered for the change of the target SA-CA10 based on CA10-90 after the lean limit control according to Embodiment 3 is performed in the same way.

Figure 16:
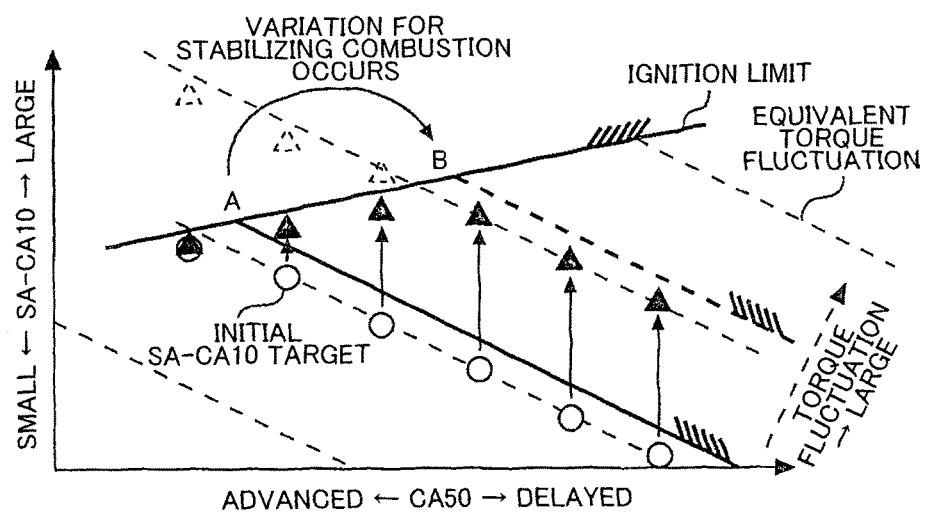
FIG. 16 is a diagram illustrating setting of a target SA-CA10 in consideration of an ignition limit in addition to a torque fluctuation limit using CA50 in the vicinity of the MBT.

FIG. 16 is a diagram illustrating the setting of a target SA-CA10 when an ignition limit is considered in addition to a torque fluctuation limit in correlation with CA50 in the vicinity of the MBT. As described in Embodiment 1, the target SA-CA10 is a value having a significant meaning as an index value for controlling the air-fuel ratio in the vicinity of the lean limit (the air-fuel ratio when the torque fluctuation is a limit from the viewpoint of drivability of the internal combustion engine 10). When CA50 and SA-CA10 converge on the respective target values by the feedback control using both in a certain operation condition, an equivalent torque fluctuation line (thin dotted line) in which the torque fluctuation is constant has a tendency that the target SA-CA10 decreases as CA50 is more delayed (in other words, as the ignition time is more delayed) as illustrated in FIG. 16.

Here, "initial state A" and "state B" are assumed as the state of the internal combustion engine 10. The target SA-CA10 in initial state A has a tendency that the target SA-CA10 more decreases as CA50 (ignition time) is more delayed in the vicinity of the MBT within a range exceeding a torque fluctuation limit line (thick solid line) in initial state A as indicated by white circles in FIG. 12 (see the setting of the target SA-CA10 based on the target ignition efficiency in Embodiment 3). State B is assumed to be a state (for example, deposits are formed on the wall surface of a cylinder so as to strengthen the tumble flow) after a variation for stabilizing the combustion (the variation in which the main combustion rate is raised) occurs in the internal combustion engine 10 relative to initial state A. The factor for causing the variation for stabilizing the combustion includes, for example, performing of maintenance of cleaning the inside of the engine for removing the deposits in addition to the aged deterioration.

When the state of the internal combustion engine 10 is changed (the in-cylinder environment is changed or the like) from initial state A to state B, the torque fluctuation limit line is changed from the line indicated by the thick solid line to the line indicated by the thickn dotted line. According to the change of the target SA-CA10 based on CA10-90 in Embodiment 1, when such a change occurs, that is, when ΔCA10-90 is smaller than the predetermined value $CA_{th2}$ and thus the main combustion rate is high, the target SA-CA10 increases within a range not exceeding the torque fluctuation limit line (thick dotted line) after the change as indicated by arrows from white circles to black triangles in FIG. 16.

On the other hand, when the ignition time is delayed in the vicinity of the MBT, the main combustion rate is lowered but gas in a cylinder is ignited at the timing at which the temperature and the pressure thereof becomes higher. As a result, in the vicinity of the MBT, as the ignition time is delayed, the air-fuel ratio as the ignition limit of the fuel-air mixture in the cylinder increases. Accordingly, even when the ignition time is delayed in the state where the main combustion rate is sufficiently high as in step B but the torque fluctuation does not occur due to the decrease in the main combustion rate, it is possible to perform a stable operation on the leaner side as the ignition limit is raised. Accordingly, as illustrated in FIG. 16, the target SA-CA10 at the ignition limit increases as CA50 (ignition time) is delayed.

However, when the tendency of the ignition limit line illustrated in FIG. 16 is not considered for the change of the target SA-CA10 based on CA10-90, the main combustion rate is sufficiently high (CA10-90 is small) and thus there is a possibility that the ignition limit will be exceeded depending on CA50 (ignition time) when it is intended to increase the target SA-CA10 from the white circles to the black triangles (corresponding to the triangles indicated by dotted lines in FIG. 16).

Therefore, in this embodiment, when ΔCA10-90 is smaller than the predetermined value $CA_{th2}$ (the actual CA10-90 is small), the target SA-CA10 increases on the basis of CA10-90 within a range not exceeding the value at the ignition limit of the fuel-air mixture in a cylinder. The change of the target SA-CA10 based on this idea can be said to be a change of the target SA-CA10 to a larger value as the ignition time (CA50) is delayed in the situation (in the situation where the actual CA10-90 is small) where ΔCA10-90 is smaller than the predetermined value $CA_{th2}$ within a certain ignition time range (the CA50 range including four black triangles from the left end in FIG. 16).

Figure 17A:
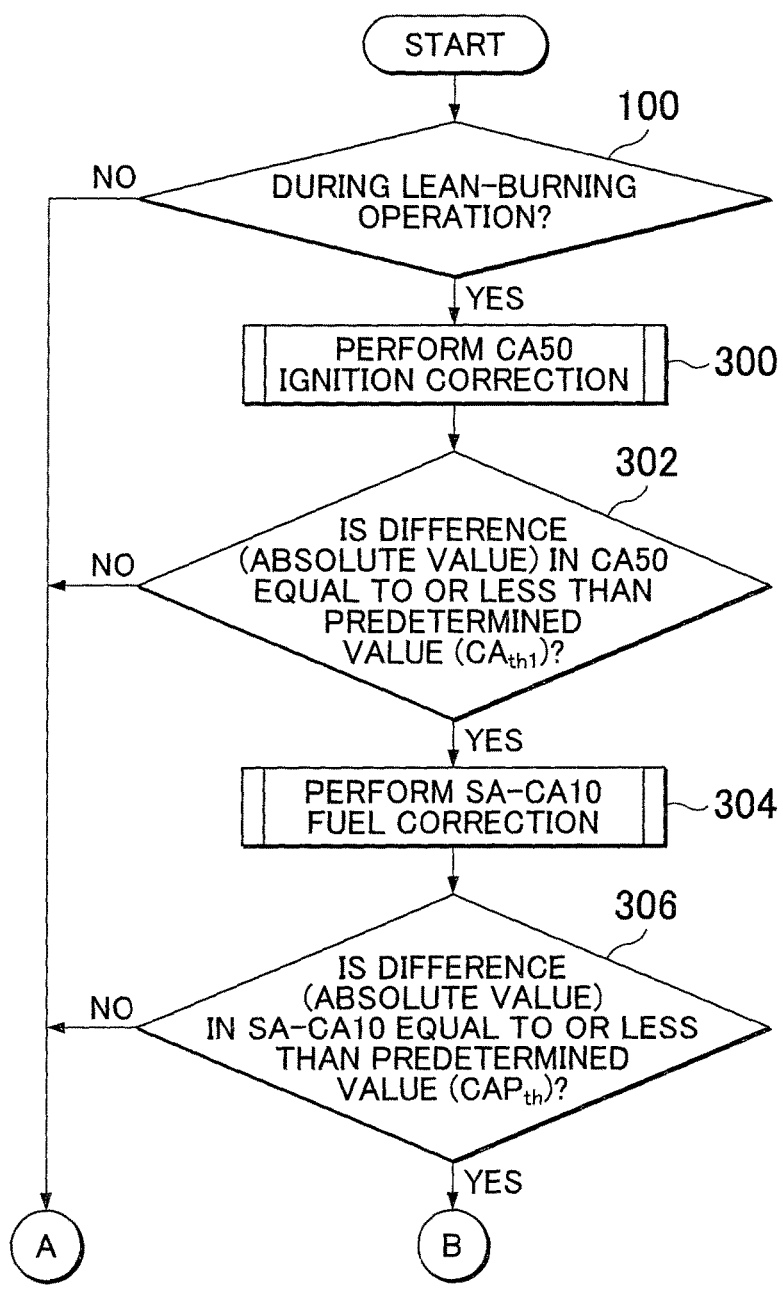
FIG. 17 is a flowchart illustrating a main routine that is performed in Embodiment 4 of the invention.
Figure 17B:
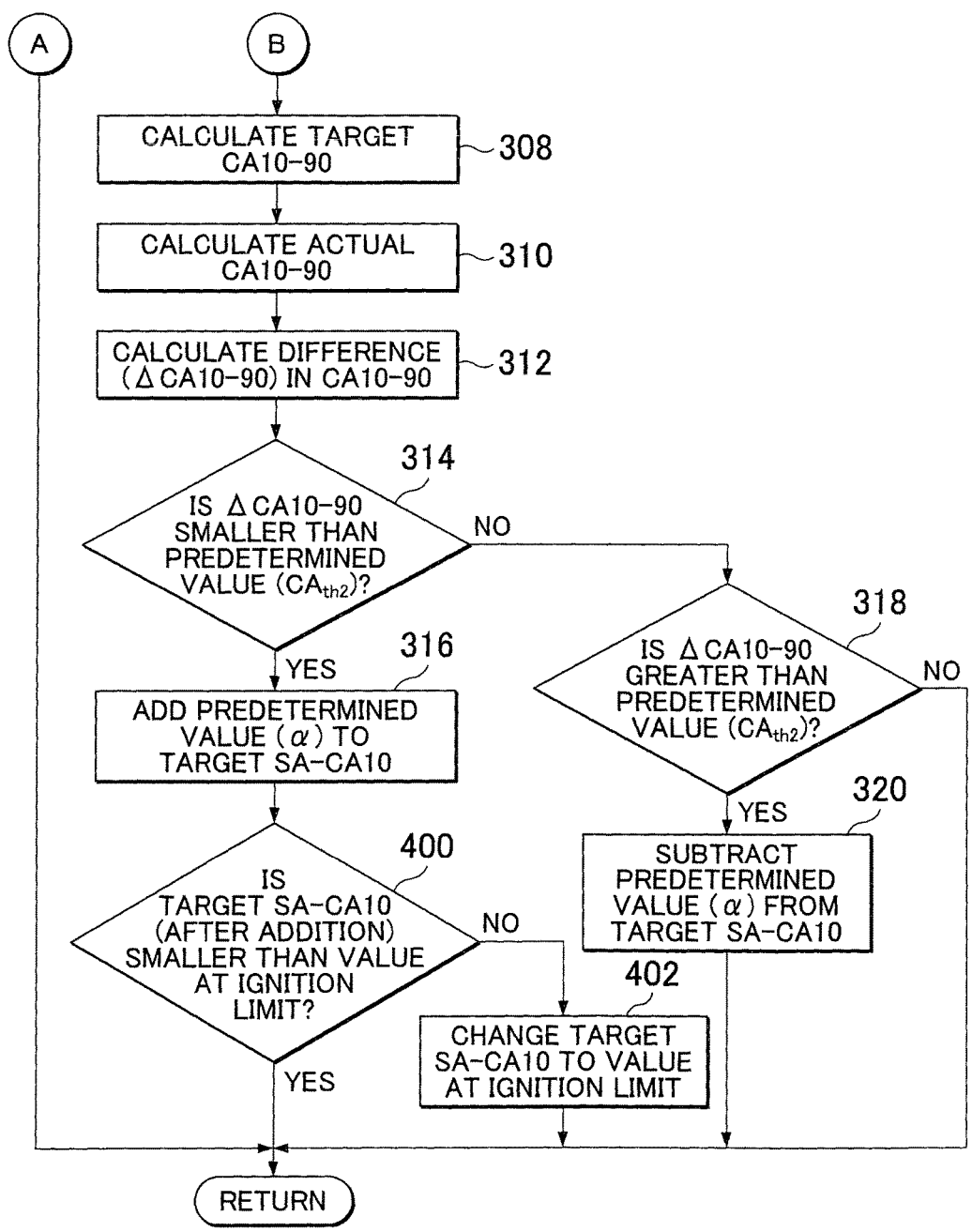

FIG. 17 is a flowchart illustrating a main routine that is performed by the ECU 40 so as to implement the lean limit control according to Embodiment 4 of the invention. In FIG. 17, the same steps as the steps described in Embodiments 1 to 3 will be referenced by the same reference signs and description thereof will not be repeated or will be made in brief.

In the routine illustrated in FIG. 17, after it is determined in step 314 that ΔCA10-90 is smaller than the predetermined value $CA_{th2}$, the ECU 40 adds a predetermined value a to the target SA-CA10 in step 316 and then moves the routine to step 400.

In step 400, the ECU 40 determines whether the target SA-CA10 after the addition in the process of step 316 is smaller than the value at the ignition limit. The ECU 40 stores a map in which a value of the target SA-CA10 at the ignition limit (more strictly, a value with a predetermined margin zone with respect to the value at the ignition limit) is determined with the relationship of the ignition limit line illustrated in FIG. 16, that is, in correlation with the relationship with CA50 (or the ignition time) and acquires the value of the target SA-CA10 at the ignition limit corresponding to the current CA50 (ignition time) with reference to the map in step 400.

When the determination result of step 400 is positive, that is, when it is determined that the target SA-CA10 after the adding has a margin with respect to the value at the ignition time, the correction of the target SA-CA10 is not newly performed. On the other hand, when the determination result of step 400 is negative, that is, when the target SA-CA10 after the adding is equal to or greater than the value at the ignition time, the ECU 40 changes the value of the target. SA-CA10 from the value after the adding to the value at the ignition limit so as to prevent the target SA-CA10 from being changed over the value at the ignition limit (step 402).

According to the above-mentioned processes of the main routine illustrated in FIG. 17, the following advantages can be obtained in addition to the advantages described in Embodiment 3. That is, when ΔCA10-90 is smaller than the predetermined value $CA_{th2}$ (the actual CA10-90 is small), the target SA-CA10 increases on the basis of CA10-90 within a range not exceeding the value at the ignition limit of the fuel-air mixture in a cylinder. Accordingly, in the situation where the actual CA10-90 is small and thus the main combustion rate is sufficiently high, it is possible to sufficiently enlarge the lean limit by controlling the air-fuel ratio to a lean side as much as possible within a range not exceeding the ignition limit. In addition, it is possible to appropriately set the target SA-CA10 on the basis of CA10-90 by paying attention to the point that the ignition limit line and the torque fluctuation limit line have different tendencies as illustrated in FIG. 16.

Embodiments 3 and 4 describe the feedback control of an amount of fuel injected using SA-CA10. However, the invention is not limited to the direct use of the crank angle period from an ignition time to a specified crank angle at which a predetermined mass fraction burned is obtained, such as SA-CA10, but a correlation value thereof may used instead of the crank angle period.

In Embodiments 3 and 4, the analysis result of the in-cylinder pressure data acquired using the in-cylinder pressure sensor 30 and the crank angle sensor 42 is used to calculate the mass fraction burned (MFB). However, the calculating of the mass fraction burned in the invention is not limited to the use of the in-cylinder pressure data. That is, the mass fraction burned may be calculated, for example, by detecting an ion current generated by combustion by the use of an ion sensor and using the detected ion current or may be calculated using the history of an in-cylinder temperature when the in-cylinder temperature can be measured.

Embodiments 1 to 4 describe an example in which a lean-burning operation of controlling the air-fuel ratio of a fuel-air mixture in a cylinder in the vicinity of the lean limit is performed. However, the air-fuel ratio used for the operation in the invention is not limited to the air-fuel ratio lower than a theoretical air-fuel ratio, but may be the theoretical air-fuel ratio or an air-fuel ratio higher than the theoretical air-fuel ratio.

What is claimed is:

1. A controller for an internal combustion engine, the controller comprising:
   a crank angle detector configured to detect a crank angle; and
   an ECU configured to:
   (a) calculate a mass fraction burned;
   (b) acquire the crank angle, which is detected by the crank angle detector when the mass fraction burned reaches a predetermined mass fraction burned, as a specified crank angle;
   (c) acquire a main combustion period on the basis of the mass fraction burned; and
   (d) control at least one of an amount of fuel injected, an amount of intake air, or ignition energy such that a crank angle period from the ignition time to the specific crank angle is shorter as a main combustion period is longer.

2. The controller according to claim 1, wherein the specified crank angle is a 10% combustion point (SA-CA 10).

3. A controller for an internal combustion engine, the controller comprising:
   a crank angle detector configured to detect a crank angle; and
   an ECU configured to:
   (a) calculate a mass fraction burned;
   (b) acquire the crank angle, which is detected by the crank angle detector when the mass fraction burned reaches a predetermined mass fraction burned, as a specified crank angle;
   (c) control at least one of an amount of fuel injected, an amount of intake air, or ignition energy on the basis of a first difference, the first difference being a difference between a crank angle period from an ignition time where a fuel-air mixture is ignited to the specified crank angle and a target value of the crank angle period, wherein
   the ECU is further configured to:
   (d) set the target value on the basis of a degree of separation of a target ignition time from an optimal ignition time,
   (e) acquire a main combustion period on the basis of the mass fraction burned; and
   (f) change the target value depending on a length of the main combustion period.

4. The controller according to claim 3, wherein the ECU is configured to control at least one of the amount of fuel injected, the amount of intake air, or the ignition energy on the basis of the first difference when an air-fuel ratio of fuel-air mixture in a cylinder is controlled in the vicinity of a lean-burning limit.

5. The controller according to claim 3, wherein the ECU is configured to set the target value on the basis of an engine rotation speed.

6. The controller according to claim 3, wherein the ECU is configured to set the target value on the basis of an engine load factor.

7. The controller according to claim 3, wherein the ECU is configured to set the target value to be smaller as a degree of delay of the ignition time with respect to the optimal ignition time becomes larger.

8. The controller according to claim 3 wherein the ECU is configured to set the target value to be larger as a degree of advance of the ignition time with respect to the optimal ignition time becomes larger.

9. The controller according to claim 3, wherein the ECU is configured to:
  (g) calculate a combustion gravity center position on the basis of the mass fraction burned; and
  (h) control the ignition time such that a second difference between the combustion gravity center position and a target combustion gravity center position is zero.

10. The controller according to claim 9, wherein the ECU is configured to control at least one of the amount of fuel injected, the amount of intake air, or the ignition energy on the basis of the first difference when the second difference is equal to or less than a predetermined value by the control of the ignition time.

11. The controller according to claim 10, wherein the ECU is configured to control a response speed of the control of the ignition time so as to be higher than a response speed of at least one of the amount of fuel injected, the amount of intake air, or the ignition energy.

12. The controller according to claim 3, wherein the ECU is configured to:
  (i) acquire a maximum in-cylinder pressure crank angle at which the in-cylinder pressure is a maximum in a combustion period; and
  (j) control the ignition time such that a third difference between the maximum in-cylinder pressure crank angle and a target maximum in-cylinder pressure crank angle is zero.

13. The controller according to claim 12, wherein the ECU is configured to control at least one of the amount of fuel injected, the amount of intake air, or the ignition energy on the basis of the first difference when the third difference is equal to or less than a predetermined value by the control of the ignition time.

14. The controller according to claim 3, wherein the predetermined mass fraction burned is 10%.

15. The controller according to claim 3, wherein the ECU is configured to set the target value to be smaller as the main combustion period becomes longer.

16. The controller according to claim 3, wherein the ECU is configured to set the target value to be larger as the ignition time is more delayed when the main combustion period is shorter than a predetermined value.

17. The controller according to claim 3, wherein the ECU is configured to set the target value to be larger within a range not greater than a value at an ignition limit of a fuel-air mixture in a cylinder on the basis of the main combustion period when the main combustion period is shorter than a predetermined value.

18. The controller according to claim 3, wherein the ECU is configured to:
  (k) calculate a combustion gravity center position on the basis of the mass fraction burned; and
  (l) control the ignition time such that a second difference between the combustion gravity center position and a target combustion gravity center position is zero.

19. The controller according to claim 18, wherein the ECU is configured to change the target value depending on the length of the main combustion period when the second difference is equal to or less than a predetermined value by the control of the ignition time.

20. The controller according to claim 3, wherein the ECU is configured to:
  (m) acquire a maximum in-cylinder pressure crank angle at which the in-cylinder pressure is a maximum in a combustion period; and
  (n) control the ignition time such that a third difference between the maximum in-cylinder pressure crank angle and a target maximum in-cylinder pressure crank angle is zero.

21. The controller according to claim 20, wherein the ECU is configured to change the target value depending on the length of the main combustion period when the third difference is equal to or less than a predetermined value by the control of the ignition time.

22. The controller according to claim 3, wherein the ECU is configured to change the target value depending on the length of the main combustion period when the first difference is equal to or less than a predetermined value.

* * * * *